12 United States Patent
Kunins et al.

(10) Patent No.: US 12,470,909 B1
(45) Date of Patent: Nov. 11, 2025

(54) SYSTEMS AND METHODS FOR CONTACTLESS, LOCATION-BASED COMMUNICATION

(71) Applicant: Axon Enterprise, Inc., Scottsdale, AZ (US)

(72) Inventors: Jeffrey Kunins, Seattle, WA (US); James Norton Reitz, Bainbridge Island, WA (US); Hadi Partovi, Bellevue, WA (US); Joseph Fiumara, Lake Havasu City, AZ (US)

(73) Assignee: Axon Enterprise, Inc., Scottsdale, AZ (US)

(*) Notice: Subject to any disclaimer, the term of this patent is extended or adjusted under 35 U.S.C. 154(b) by 418 days.

(21) Appl. No.: 17/955,532

(22) Filed: Sep. 28, 2022

Related U.S. Application Data

(60) Provisional application No. 63/249,443, filed on Sep. 28, 2021.

(51) Int. Cl.
*H04W 8/18* (2009.01)
*H04W 4/021* (2018.01)

(52) U.S. Cl.
CPC .............. *H04W 8/18* (2013.01); *H04W 4/021* (2013.01)

(58) Field of Classification Search
None
See application file for complete search history.

(56) References Cited

U.S. PATENT DOCUMENTS

| 8,243,140 | B1 | 8/2012 | Howe |
| 2003/0055701 | A1 | 3/2003 | Dutta et al. |
| 2003/0200227 | A1 | 10/2003 | Ressler |
| 2007/0005609 | A1 | 1/2007 | Breed |
| 2008/0238719 | A1 | 10/2008 | Marchasin et al. |
| 2011/0121991 | A1 | 5/2011 | Basir |
| 2012/0090038 | A1 | 4/2012 | Pacella et al. |
| 2012/0116661 | A1 | 5/2012 | Mizrachi |

(Continued)

FOREIGN PATENT DOCUMENTS

EP 2992692 B1 8/2018

OTHER PUBLICATIONS

Rozier, Alex. WeHo testing app that lets pulled over drivers video chat with officers. NBCUniversal Media, LLC [online], Published Sep. 22, 2023, Updated Sep. 23, 2023 [retrieved on Sep. 27, 2023]. Retrieved from the Internet <URL: https://www.nbclosangeles.com/news/local/weho-testing-app-that-lets-pulled-over-drivers-video-chat-with-officers/3230328/>.

(Continued)

*Primary Examiner* — Frantz Bataille
(74) *Attorney, Agent, or Firm* — Andrew Graham

(57) ABSTRACT

Methods, systems, and devices provide location-based communication between drivers of different vehicles. A vehicle identifier and contact information associated with one or more motorist computing devices is stored. A contact request from an officer computing device at a location of an event is received. The event may be a traffic stop. The contact request may include the vehicle identifier and location information that identifies the location. A notification that includes the location information is sent to the one or more motorist computing devices. In accordance with the contact request and notification, communication between the officer computing device and a passenger computing device of the one or more motorist computing devices is established.

20 Claims, 5 Drawing Sheets

(56) References Cited

U.S. PATENT DOCUMENTS

| | | |
|---|---|---|
| 2015/0312400 A1 | 10/2015 | Hansen |
| 2016/0294831 A1* | 10/2016 | Borunda ................. H04L 63/08 |
| 2017/0164178 A1 | 6/2017 | Anjum et al. |
| 2019/0318618 A1 | 10/2019 | Gilbert et al. |
| 2019/0325544 A1 | 10/2019 | Sweet |
| 2020/0344447 A1 | 10/2020 | Coghlan |
| 2020/0357192 A1* | 11/2020 | Thorpe ................... H04W 4/00 |

OTHER PUBLICATIONS

Safestop [retrieved on Sep. 23, 2023]. Retrieved from the Internet <URL: https://www.safetrafficstop.com>.

* cited by examiner

SYSTEMS AND METHODS FOR CONTACTLESS, LOCATION-BASED COMMUNICATION

FIELD

Embodiments of the present disclosure relate to a systems, methods, and devices for contactless communication between two or more user computing devices. The user computing devices may comprise an officer computing device and a passenger computing device commonly located at an event.

BACKGROUND

A routine traffic stop for a minor infraction can be anything but routine. For officers, busy roadways pose a dangerous threat. For citizens, getting pulled over is a nerve-wracking experience. For everyone, the entire process is tedious and antiquated. Embodiments according to various aspects of the present disclosure provide technical solutions to address these issues and others to make such an entire experience safer, easier, and faster.

BRIEF DESCRIPTION OF THE SEVERAL VIEWS OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures. To easily identify the discussion of any particular element or act, the most significant digit or digits in a reference number refer to the figure number in which that element is first introduced.

DETAILED DESCRIPTION

Figure 1:
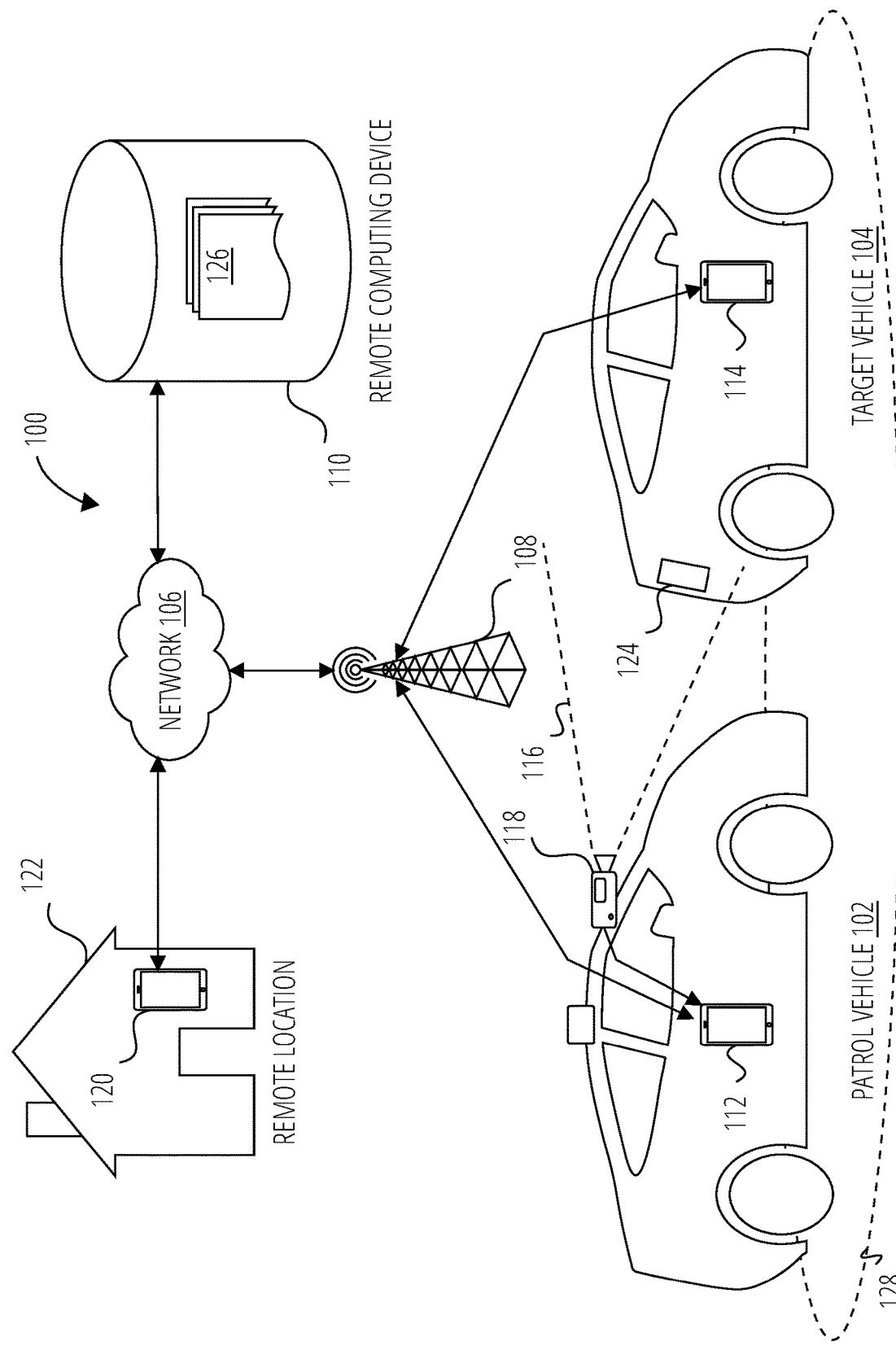
FIG. 1 is a block diagram illustrating components of a system for location-based communication in accordance with various embodiments.

Embodiments according to various aspects of the present disclosure enable safe, contactless interaction between a motorist and law enforcement personnel (e.g., an officer) during a traffic stop or another event. The interaction may enable the motorist and the officer to directly communicate without directly sharing contact information prior to the interaction. Rather, the interaction may be established using two or more user computing devices in a private, secure, and location-based manner.

In some embodiments, a motorist may enable an interaction by installing an application on their mobile phone and registering a license plate number of a vehicle they may drive. Personal information identifying the motorist is not required to enable the interaction to be initiated. Engaging in the interaction may not require a telephone number of the mobile phone to be used, much less shared with third parties as part of the interaction. If the motorist is pulled over, instead of an officer knocking on a window of the motorist's vehicle, a notification will be received on the mobile phone on which the application is installed. The notification may cause a button, link, or other input element to be displayed. A single click or other simple interaction with the input element will start a video call with the officer, safely from their vehicle behind the motorist. From this safe distance, the interaction may enable a relationship between the motorist and the motorist's vehicle to be identified, driver license information to be provided, vehicle registration information to be provided, and if appropriate, a contactless electronic ticket to be issued. The ticket may be further paid from the motorist's mobile phone. At the completion of the interaction, both the motorist and the officer may drive away in their respective distance. The entire interaction may be conducted from a safe distance, avoiding an accidental misunderstanding that may suddenly and unintentionally escalate the event. These embodiments and others according to various aspects of the present disclosure expedite access and receipt of information by an officer computing device. These embodiments and others may further ensure that information is obtained from a nearby user and user computing device, while maintaining a minimum physical distance between users. Such embodiments may also enable users to avoid physical dangers associated with a location of a traffic stop, including moving traffic and inclement weather. These benefits, as well as other improvements to the event capture technology, are further evident and demonstrated by the detailed description further presented below.

As used herein, a contactless interaction may comprise a synchronous, local exchange of information between users via respective user computing devices that is conducted independent of (e.g., excludes, does not require, does not include, etc.) face-to-face interaction between the users. Rather, the contactless interaction may be mediated by the plurality of computing devices of a system configured to provide the contactless interaction.

In embodiments, contactless interactions may enable multiple persons related to a vehicle to be involved with an event. For example, a parent and child may share a vehicle. When a traffic stop occurs and the child is the driver of the vehicle, the parent may be notified of the event. The parent may be notified of the event, even when they are not near to the event. Each of the parent, the child, and an officer that initiated the traffic stop may communicate during the traffic stop via their respective mobile devices.

In embodiments, contactless interactions may further be expedited. For example, a motorist may provide driver license information and insurance information for verification prior to a traffic stop. When the traffic stop occurs, validated driver information comprises verified driver license information and insurance information may be provided to an officer conducting the traffic stop. The verified driver information may rapidly provide information regarding the driver and vehicle. This rapid provision of information may save time otherwise used to obtain the information during the event, potentially decreasing an amount of time required to conduct the traffic stop.

According to various aspects of the present disclosure, a system for establishing contactless interactions may be provided. For example, and with brief reference to FIG. 1, system 100 may comprise a plurality of computing devices configured to provide a contactless interaction. The plurality of computing devices may comprise a remote computing device. For example, system 100 may comprise remote computing device 110. The plurality of computing devices may further comprise two or more user computing devices. For example, the user computing devices may comprise officer computing device 112 (e.g., first user computing device). The user computing devices may further include one or more motorist computing devices. For example, a first motorist computing device (e.g., second user computing device) may comprise passenger computing device 114. Passenger computing device 114 may comprise a first motorist computing device of the two or more motorist computing devices. The one or more motorist computing devices may further comprise a second motorist computing device, notified computing device 120. System 100 may further comprise at least one network 106 by which the plurality of computing devices may communicate. Network 106 may at least partially comprise a wireless network 108. In embodiments, network 106 may enable communication between one or more computing devices of system 100 located at a location 128 of an event, as well as one or more computing devices located remote from the event.

A remote computing device may be configured to mediate communication between two or more user computing devices. The remote computing device may enable the communication to be conducted in a secure, contactless manner that maintains privacy of users of the two or more user computing devices. For example, remote computing device 110 may be configured to establish communication (e.g., a communication session) between officer computing device 112 and passenger computing device 114. Remote computing device 110 may be configured to communicate with the two or more user computing devices via network 106. In embodiments, remote computing device 110 may comprise a server and one or more data stores. Remote computing device 110 may be located remote from a location (e.g., location 128) at which an event occurs.

A user computing device may be configured to participate in a communication session (i.e., communicate) with another user computing device. The user computing device may be configured to initiate or accept (e.g., grant, join, acknowledge, etc.) the communication session. The user computing device may be configured to exchange information (e.g., setup information) with another computing device prior to the communication session. The information may comprise asynchronous communication information. The information may be exchanged with a third computing device different from the other user computing device (e.g., remote computing device 110). For example, each user computing device of officer computing device 112 and passenger computing device 114 may transmit and receive information with remote computing device 110 prior to communication being established via remote computing device 110. The user computing device may be further configured to exchange communication information with the other user computing device. The communication information may be exchanged as part of a communication session. The communication information may be exchanged responsive to previously transmitted and received setup information for the communication with the other user computing device. The communication information (e.g., communication data) may comprise synchronous communication information. In embodiments, the communication information may comprise image data and audio data. The image data may comprise at least one of a single image or a sequence of images (e.g., video data). The communication information may comprise a transmitted live stream of audio data, image data, or audio data and image data from the user computing device to the other user computing device. The communication information may comprise a received live stream of audio data, image data, or audio data and image data to the user computing device from the other user computing device.

In embodiments, a user computing device may comprise a portable computing device. The portable computing device may be moved between different physical locations. The portable computing device may engage in communication with another user computing device at each of the different locations. For example, the user computing device may comprise a handheld computing device or a vehicle-mounted computing device.

In embodiments, a first user computing device of the plurality of computing devices of system 100 may comprise an officer computing device. The officer computing device, or initiating computing device, may request communication with another user computing device. The officer computing device may be associated with an officer or other law enforcement personnel. The officer computing device may transmit a contact request to another computing device of system 100 in response to an input received by the officer computing device. For example, officer computing device 112 may transmit a contact request automatically in response to an input received via a user interface of officer computing device 112 or received from another computing device (e.g., license plate reader 118) via a network interface of officer computing device 112. Officer computing device 112 may be selectively, communicatively coupled to one or more of remote computing device 110, passenger computing device 114, or notified computing device 120 via network 106. In embodiments, officer computing device 112 may communicate with another user computing device (e.g., passenger computing device 114) via wireless network 108 of network 106. In embodiments, officer computing device 112 may comprise a mobile phone, smartphone, or tablet computing device. Alternately or additionally, officer computing device 112 may comprise a vehicle-mounted computing device physically integrated with a vehicle (e.g., patrol vehicle 102). For example, officer computing device 112 may comprise a display and user interface integrated in a dashboard of the vehicle or a mobile data terminal physically integrated with the vehicle.

During an event, such as a traffic stop, officer computing device 112 may be disposed in a vehicle operated by an officer associated with officer computing device 112. The vehicle may be proximate another vehicle involved with the event. The vehicle and officer computing device 112 may each be located at a location of the event. For example, officer computing device 112 may be disposed in patrol vehicle 102. Officer computing device 112 and patrol vehicle 102 may each be located at location 128 of the event.

In embodiments, a user computing device may comprise a motorist computing device. A motorist computing device may enable (e.g., authorize, accept, etc.) requested communication to be conducted via the motorist computing device. The motorist computing device may be associated with a motorist. For example, the motorist computing device may be associated with a person that may use a vehicle. For example, the person may comprise a passenger of a vehicle. The passenger may be a driver of the vehicle. The motorist computing device may receive and transmit setup information to establish the requested communication. The motorist computing device may receive and transmit communication information during the communication. For example, a motorist computing device comprising passenger computing device 114 may exchange setup information with remote computing device 110 and communication information with officer computing device 112 according to various aspects of the present disclosure. In embodiments, a motorist computing device may communicate with another computing device (e.g., officer computing device 112, remote computing device 110, etc.) of system 100 via network 106. In embodiments, a motorist computing device may comprise a mobile phone, smartphone, or tablet computing device. Alternately or additionally, officer computing device 112 may comprise a vehicle-mounted computing device physically integrated with a vehicle (e.g., target vehicle 104). For example, passenger computing device 114 may comprise a display and user interface integrated in a dashboard of target vehicle 104.

In embodiments, a motorist computing device may determine a location of the motorist computing device. The location may be a current location of the motorist computing device. The location may be indicated via location information for the motorist computing device. In embodiments, the motorist computing device may comprise a geographical sensor configured to generate current location information indicating a current location of the motorist computing device at a time the current location information is generated. For example, passenger computing device 114 may comprise a global positioning sensor (GPS) that provides passenger computing device 114 with geographic information (e.g., second geographic information) that indicates the current location of the motorist computing device. Alternately or additionally, the current location information may be received via a user interface of motorist computing device. The motorist computing device may perform a comparison between the current location and received location information that indicates a location of an event. The comparison may indicate that the motorist computing device is located at the event (e.g., received location and current location are the same, within a threshold distance, user-indicated to match, etc.) or not located at the event (e.g., received location and current location are different, beyond the threshold distance, user-indicated to not match, etc.). A motorist computing device located at a location of an event may comprise a passenger computing device. A motorist computing device located remote from the event (e.g., not located at the location of the event) may comprise a notified computing device. Such an arrangement may provide various technical benefits, including precluding a requirement for current location information to be shared to a remote computing device. Such an arrangement may also increase security of current location information for a user computing device, among other technical benefits according to various aspects of a present disclosure.

In embodiments, a motorist computing device may comprise a passenger computing device. A passenger computing device may comprise a motorist computing device identified to be located at the location of the event. For example, a first motorist computing device may comprise passenger computing device 114. The passenger computing device 114 may self-determine that it is located at the event. Responsive to receiving a notification of the event and determining the passenger computing device 114 is located at the location of the event, passenger computing device 114 may provide (e.g., output, display, notify) an alert indicating the event. The alert may indicate the notification has been received by the passenger computing device. The alert may automatically be provided by passenger computing device 114. The alert may indicate communication with another user computing device has been requested relative to the event. The alert may enable the communication to be initiated or otherwise conducted. The alert may comprise one or more of a visual, audible, tactile, or other human-perceivable alert. In embodiments, the alert may be output via a user interface integrated with passenger computing device 114 or in communication with passenger computing device 114.

During an event, passenger computing device 114 may be disposed in a vehicle operated by a motorist associated with passenger computing device 114. The vehicle may be proximate another vehicle involved with the event. The vehicle and passenger computing device 114 may each be located at a location of the event. For example, passenger computing device 114 may be disposed in target vehicle 104. Passenger computing device 114 and target vehicle 104 may each be located at location 128 of the event.

In embodiments, a motorist computing device may comprise a notified computing device. A notified computing device may comprise a motorist computing device identified to be located remote from the location of the event (e.g., remotely located). For example, a second motorist computing device may comprise notified computing device 120. Notified computing device 120 may self-determine that it is not located at the event. Responsive to receiving a notification of the event and determining the notified computing device 120 is remotely located from the event, notified computing device 120 may provide (e.g., output, display, notify) an alert indicating the event. The alert may indicate the notification has been received by the notified computing device. The alert may indicate communication with another user computing device has been requested relative to the event. The alert may comprise one or more of a visual, audible, tactile, or other human-perceivable alert. In embodiments, the alert may be output via a user interface integrated with notified computing device 120 or in communication with notified computing device 120.

In embodiments, and in contrast with a passenger computing device, a notified computing device may selectively provide the alert responsive to the notification of the event. The notified computing device may comprise configuration information that indicates whether the alert should be provided for the notified computing device. The notified device may perform one or more operations responsive to a received notification and the configuration information. In some embodiments, the notified computing device may be configured to generate alerts for each event associated with a vehicle identifier included in stored vehicle information. The alert may enable the notified computing device to join communication requested for the event, despite the notified computing device not being located at the event. For example, notified computing device 120 may participate in communication between officer computing device 112 and passenger computing device 114, despite notified computing device 120 being disposed at remote location 122 physically distanced from location 128. In other embodiments, the notified computing device may ignore (e.g., discontinue processing the notification, not generate an alert, etc.) the notification when the notified computing device is determined to not be located at the event. Such an arrangement may avoid alerts from being generated for a non-local user computing device, including events for which the user computing device is not involved.

During an event, notified computing device 120 may be disposed at a remote location relative to a location of the event. The notified computing device 120 may communicate with a user computing device at the event via network 106, but not be within a line of sight or otherwise located at the event. For example, notified computing device 120 may be disposed at remote location 122 when communication is requested relative to an event.

In embodiments, system 100 may comprise a vehicle sensor device configured to detect a vehicle. The vehicle may comprise a first vehicle (e.g., target vehicle). The vehicle may be proximate the vehicle sensor device. The vehicle may be further proximate another vehicle (e.g., second vehicle, patrol vehicle, etc.) associated with an officer computing device. The vehicle sensor device may comprise components that capture information representing the vehicle and, in accordance with the captured information, generate a vehicle identifier of the vehicle. For example, system 100 may comprise a license plate reader 118 configured to detect target vehicle 104 in image data captured by an image sensor of license plate reader 118 and generate a vehicle identifier associated with target vehicle 104. The license plate reader 118 may have a field of view 116. In example embodiments, a license plate 124 of target vehicle 104 may be positioned within field of view 116 of license plate reader 118. License plate reader 118 may capture image data representing one or more alphanumeric characters, a geographic region, or a combination thereof displayed by license plate 124. Based on the image data, license plate reader 118 may generate a vehicle identifier for target vehicle 104.

In embodiments, the vehicle sensor device may be communicatively coupled to an officer computing device. The vehicle sensor device may be disposed in wired or wireless communication with the officer computing device. The vehicle sensor device may be communicatively coupled with the officer computing device to transmit a vehicle identifier generated by the vehicle sensor device to the officer computing device. The officer computing device may automatically receive the vehicle identifier from the vehicle sensor device. In embodiments, the vehicle identifier may be automatically populated or otherwise stored on the officer computing device for subsequent processing by the officer computing device. For example, license plate reader 118 may automatically transmit a vehicle identifier indicating a license plate number of license plate 124 to officer computing device 112 via a wired or short-range wireless communication network. The vehicle identifier may be automatically populated in a contact request subsequently transmitted by officer computing device 112. In alternate or additional embodiments, system 100 may not include a vehicle sensor device. In such embodiments, a vehicle identifier may be received by an officer computing device (e.g., officer computing device 112) via a user interface of the officer computing device. The vehicle identifier, independent of a manner received, may be available for subsequent processing at an officer computing device according to various aspects of the present disclosure.

In embodiments, location 128 (i.e., location of an event) may comprise a location of a vehicle, user computing device, multiple vehicles, multiple computing devices or combinations thereof. A vehicle or a computing device by which location 128 is determined may comprise a geographical sensor configured to generate location information indicating location 128. For example, officer computing device 112 may comprise a global positioning sensor (GPS) that provides officer computing device 112 with geographic information that indicates location 128. Alternately or additionally, the location information may be received via a user interface of the vehicle or user computing device.

According to various aspects of the present disclosure, an event may comprise a traffic stop. However, embodiments according to various aspects of the present disclosure may also be used with other events that may comprise local communication from a minimum physical distance (e.g., 10 feet, 30 feet, 50 feet, etc.). For example, an event may comprise a wellness check, a witness interviews, or other interactions between users of different user computing devices.

In various embodiments, two or more computing devices of system 100 may be in electronic communication via a network. For example, two or more of officer computing device 112, passenger computing device 114, and remote computing device 110 may be in electronic communication via a network 106. As used herein, the term "network" may further include a cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 2:
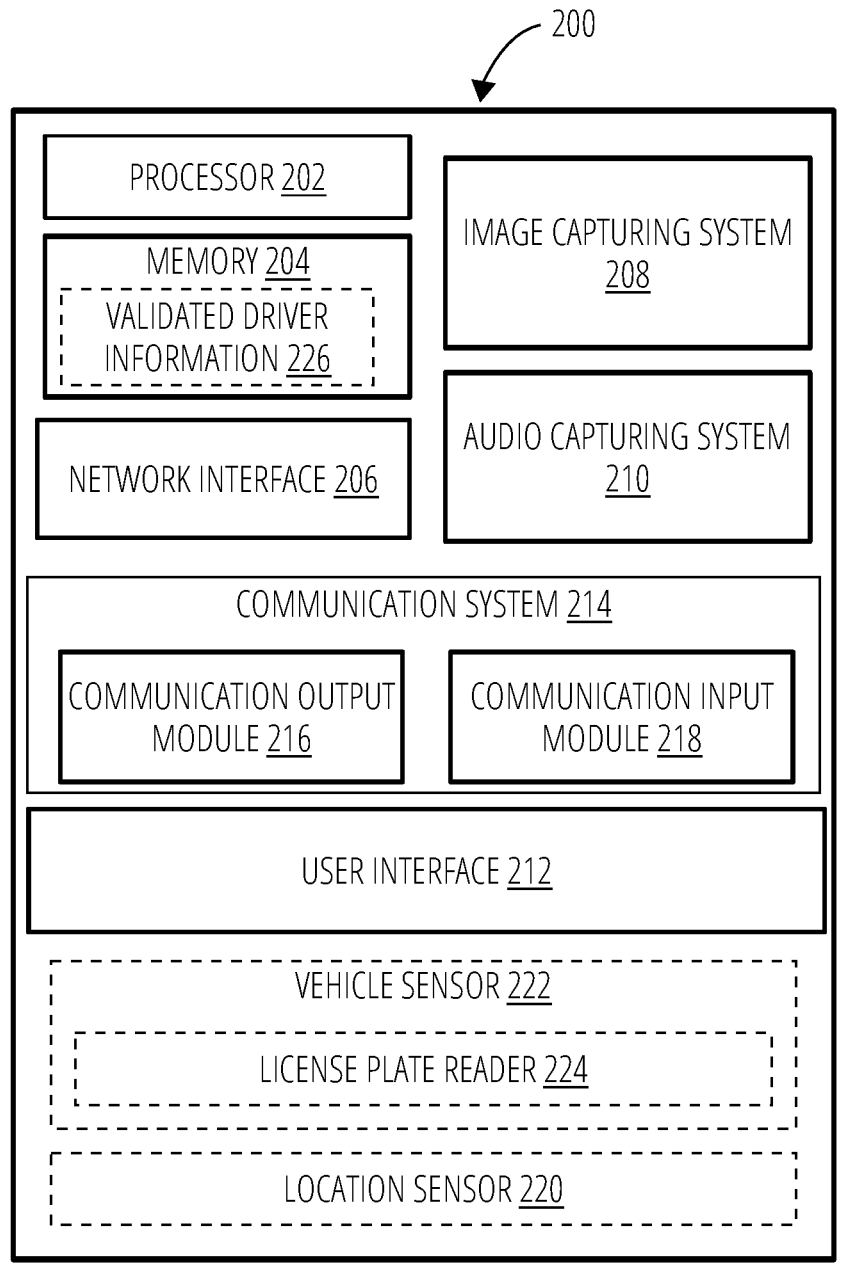
FIG. 2 is a block diagram of an exemplary computing device in accordance with various embodiments.

In various embodiments, and with reference to FIG. 2, an exemplary computing device 200 is disclosed. Computing device 200 may comprise a processor 202, a memory 204, a network interface 206, an image capturing system 208, an audio capturing system 210, a user interface 212, and/or communication system 214. Communication system 214 may further comprise one or more of a communication output module 216 or communication input module 218. Computing device 200 may further comprise location sensor 220. In embodiments, computing device 200 may perform one or more operations of a respective user computing device. For example, computing device 200 may be configured to perform one or more operations of officer computing device 112 or, alternately, a motorist computing device such as passenger computing device 114 or notified computing device 120 with brief reference to FIG. 1. Each of the user computing devices may be respectively implemented by a separate, different computing device comprising one or more components of computing device 200.

In some embodiments, computing device 200 may further comprise vehicle sensor 222. Vehicle sensor 222 may comprise a license plate reader 224. Computing device 200 comprising a vehicle sensor 222 may perform one or more operations of license plate reader 118 with brief reference to FIG. 1.

Processor 202 may be similar to and/or perform one or more operations of a processor, processing circuit, or the like discussed herein. Processor 202 may comprise circuitry, electrical components, electronic components, software, and/or the like configured to perform various operations and functions discussed herein. For example, processor 202 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or a combination thereof. In various embodiments, processor 202 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 202 may include data buses, output ports, input ports, timers, memory, arithmetic units, and/or the like.

Processor 202 may be configured to provide and/or receive electrical signals whether digital and/or analog in form. Processor 202 may provide and/or receive digital information via a data bus using any protocol. Processor 202 may receive information, manipulate the received information, and provide the manipulated information. Processor 202 may record (e.g., buffer, store, etc.) information and retrieve recorded information. Information received, recorded, and/or manipulated by processor 202 may be used to perform a function, control a function, and/or to perform an operation or execute a stored program. In embodiments, processor 202 may be configured to perform and/or cause computing device 200 to perform one or more operations discussed below with regards to FIG. 4A-4B.

Processor 202 may control the operation and/or function of other circuits and/or components of computing device 200. Processor 202 may receive status information regarding the operation of other components, perform calculations with respect to the status information, and provide commands (e.g., instructions) to one or more other components. Processor 202 may command another component to start operation, continue operation, alter operation, suspend operation, cease operation, or the like. Commands and/or status may be communicated between processor 202 and other circuits and/or components via a type of bus (e.g., SPI bus) including various types of data/address buses. In embodiments, processor 202 may control one or more other components of computing device 200 to perform and/or cause computing device 200 to perform one or more operations discussed below with regards to FIG. 4A-4B.

In various embodiments, processor 202 may be in electrical and/or electronic communication with memory 204, network interface 206, image capturing system 208, audio capturing system 210, and/or communication system 214. Processor 202 may be in electrical, electronic, and/or mechanical communication with user interface 212. Processor 202 may be in electrical, electronic, and/or mechanical communication with location sensor 220 and/or vehicle sensor 222.

Figure 3:
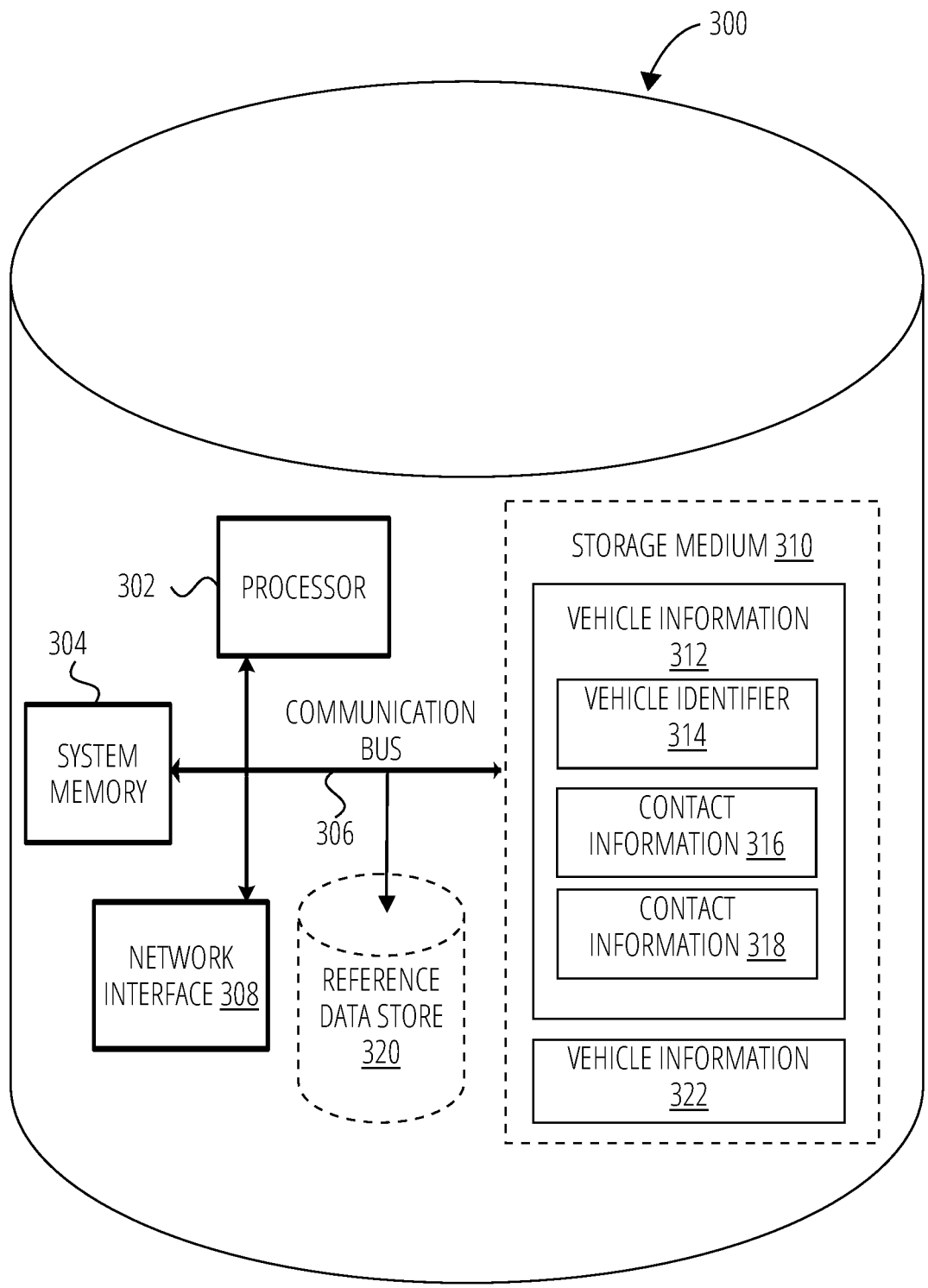
FIG. 3 is a block diagram of an exemplary computing device in accordance with various embodiments.

Memory 204 may be similar to system memory 304, storage medium 310, and/or reference data store 320 with brief reference to FIG. 3, and/or another memory discussed herein. Memory 204 may comprise one or more memory, data structures, or the like configured to record data, programs, and/or instructions. Memory 204 may be in electrical and/or electronic communication with processor 202, network interface 206, image capturing system 208, audio capturing system 210, user interface 212, communication system 214, location sensor 220, and/or vehicle sensor 222.

In an embodiment, memory 204 may comprise a tangible, non-transitory computer-readable memory. Instructions stored on the tangible non-transitory memory may allow processor 202 to perform various operations, functions, and/or steps, as described herein. For example, in response to processor 202 executing the instructions on the tangible non-transitory memory, processor 202 may communicate with image capturing system 208 and/or audio capturing system 210 to capture image and/or audio data, alter captured communication audio data, cease altering captured communication audio data, end capturing of the image and/or audio data, and/or the like. Alternately or additionally, in response to processor 202 executing the instructions on the tangible non-transitory memory, processor 202 may communicate with location sensor 220 to obtain current location information from location sensor 220. Alternately or additionally, in response to processor 202 executing the instructions on the tangible non-transitory memory, processor 202 may communicate with vehicle sensor 222 to obtain one or more vehicle identifiers from vehicle sensor 222. Processor 202 may execute the instructions in response to operation of user interface 212. In an embodiment, memory 204 may also be configured to receive, store, and maintain event recordings, including captured image, audio data, driver license information, vehicle identifier, and/or insurance information. In that regard, memory 204 may include a storage medium, data structure, database, memory unit, hard-disk drive (HDD), solid state drive (SSD), removable memory, and/or the like.

Network interface 206 may be similar to and/or comprise another network interface as discussed elsewhere herein. Network interface 206 may be configured to enable the transmission and/or reception of data between computing device 200 and one or more additional devices, servers, networks, or the like. Network interface 206 may be in electric and/or electronic communication with processor 202 and/or memory 204. Network interface 206 may comprise one or more suitable hardware and/or software components capable of enabling the transmission and/or reception of data, such as, for example, a communications unit, as discussed further herein. In various embodiments, network interface 206 may receive data associated with one or more of insurance information, communication information, driver information, insurance information, and/or driver license information as further described herein. In various embodiments, network interface 206 may transmit data associated with one or more of communication information, a contact request, and/or an electronic ticket as further described herein.

Image capturing system 208 may be configured to capture an image or series of images (e.g., video). For example, during an event, image capturing system 208 may be configured to capture images and/or video of a communication session. Image capturing system 208 may comprise various hardware and/or software components configured to capture images and/or video. For example, image capturing system 208 may comprise one or more cameras configured to capture images and/or video. Image capturing system 208 may be in electric and/or electronic communication with processor 202, memory 204, and/or network interface 206. Processor 202 may control (e.g., instruct) image capturing system 208 to begin capturing images and to end capturing of the images. Processor 202 may also control (e.g., instruct) image capturing system 208 to transmit the captured images to memory 204 for storage. Processor 202 may also control (e.g., instruct) image capturing system 208 to transmit the captured images to network interface 206 for transmission to another computing device (e.g., another user computing device) during a communication session. Image capturing system 208 may transmit (e.g., stream) the captured images to memory 204 and/or network interface 206 as the images are captured.

Audio capturing system 210 may be configured to capture audio. For example, during an event, audio capturing system 210 may be configured to capture audio data of a communication session. Audio capturing system 210 may comprise various hardware and/or software components configured to capture audio. For example, audio capturing system 210 may comprise one or more microphones configured to capture audio. Audio capturing system 210 may be in electric and/or electronic communication with processor 202, memory 204, and/or network interface 206. Processor 202 may control (e.g., instruct) audio capturing system 210 to begin capturing audio and to end capturing of the audio. Processor 202 may also control (e.g., instruct) audio capturing system 210 to transmit the captured audio to memory 204 for storage. Processor 202 may also control (e.g., instruct) image audio capturing system 210 to transmit the captured images to network interface 206 for transmission to another computing device (e.g., another user computing device) during a communication session. Audio capturing system 210 may transmit (e.g., stream) the captured audio to memory 204 and/or network interface 206 as the audio (e.g., audio) is captured.

User interface 212 may be configured to enable a user to interact with computing device 200. For example, user interface 212 may be configured to enable the user to control operation of computing device 200, including starting and stopping audio and/or image recording, as well as transmitting a contact request and/or receiving information from another computing device. As a further example, user interface 212 may enable a user to control the ingestion and transmission of audio, including communication audio data, the volume of audio output, and/or the like. User interface 212 may be in electrical, electronic, and/or mechanical communication with processor 202 and/or communication system 214.

User interface 212 may comprise any suitable hardware, software, mechanical, and/or electronic components configured to enable the user interaction. For example, and in accordance with various embodiments, user interface 212 may comprise a button, switch, or the like. In that regard, user interface 212 may be configured to move, slide, rotate, or otherwise become physically depressed or moved upon application of physical contact. As a further example, and in accordance with various embodiments, user interface 212 may comprise a touchscreen or similar interface enabling user input. As a further example, and in accordance with various embodiments, user interface 212 may include voice control technology. In that regard, user interface 212 may at least partially integrate with audio capturing system 210 to receive voice commands (e.g., "Record", "Stop Record", "Capture Image", "Record Audio", "Start Communication", "Request Contact", etc.). Voice command technology is known in the art, and user interface 212 may implement a suitable voice command technology.

In various embodiments, communication system 214 may comprise a communication output module 216 and/or a communication input module 218.

Communication output module 216 may be configured to output audio, video, and/or other signal data. For example, communication output module 216 may be configured to output communication audio data and/or communication video data. Communication output module 216 may comprise one or more components (e.g., hardware, software, etc.) configured to generate and/or output audio such as, for example, audio processing and/or generating components (e.g., discrete soundcards, integrated soundcards, processors, processing circuits, integrated circuits, amplifier, etc.), audio output devices or components (e.g., speakers), and/or the like. Communication output module 216 may comprise one or more components (e.g., hardware, software, etc.) configured to generate and/or output one or more images such as, for example, image or video processing and/or generating components (e.g., discrete graphics cards, integrated graphics cards, processors, processing circuits, integrated circuits, amplifier, etc.), output or display devices (e.g., monitor, monochrome display, colored display, cathode ray tube [CRT], liquid crystal display [LCD], light emitting diode [LED] display, projector, video card, etc.), and/or the like. Communication output module 216 may also comprise one or more components configured to generate and/or output signals, such as for example signal generating components, wireless transmission components, and/or the like.

Communication input module 218 may be configured to ingest user inputs. The user inputs may comprise audio and/or video inputs. For example, communication input module 218 may be configured to ingest communication audio data and video data from a user. Communication input module 218 may comprise one or more components (e.g., hardware, software, etc.) configured to ingest audio such as, for example, audio processing components (e.g., discrete soundcards, integrated soundcards, processors, processing circuits, integrated circuits, amplifier, etc.), audio input components (e.g., microphones), and/or the like. Communication input module 218 may comprise one or more components (e.g., hardware, software, etc.) configured to ingest video such as, for example, video signal processing components (e.g., video card) and/or video input components (e.g., a charge coupled device). Communication input module 218 may comprise a camera configured to capture image data. In various embodiments, communication input module 218 may at least partially share components with audio capturing system 210. For example, communication input module 218 and audio capturing system 210 may together comprise a single microphone (or plurality of microphones) configured to capture all audio (e.g., event audio data, communication audio data, etc.).

In various embodiments, communication input module 218 may comprise discrete components from audio capturing system 210 and/or image capturing system 208. For example, communication input module 218 and audio capturing system 210 may each comprises separate microphones or sets of microphones. The microphone for audio capturing system 210 may be configured to capture event audio data. The microphone for communication input module 218 may be configured to capture communication audio data. In that regard, the microphone for communication input module 218 may be angled or directed towards a user's mouth to more efficiently capture the communication audio data. The microphone for audio capturing system 210 may be angled or directed in a different (e.g., perpendicular, opposite, etc.) direction to more efficiently capture event audio data. Alternately or additionally, the microphones may comprise different frequency responses, different directionalities, or other different characteristics.

In various embodiments, location sensor 220 may be configured to detect a location of computing device 200. The location may comprise a current location of computing device 200. Location sensor 220 may periodically detect the location. Alternately or additionally, location sensor 220 may detect the location upon request from another computing device in communication with computing device 200. Location sensor 220 may generate location information indicating the location of computing device 200. The location information may comprise one or more of a latitude, longitude, or height. Alternately or additionally, the location information may comprise country, state, province, county, parish, street, or street address information. In embodiments, the location sensor may comprise a Global Position System (GPS) receiver. In embodiments, the location information may indicate a current location of computing device 200. Location information generated by location sensor 220 indicating the current location may comprise current location information. In embodiments, the current location may comprise a most recent location of computing device 200 detected via location sensor 220. Alternately or additionally, the current location may comprise a location of computing device 200 detected via location sensor 220 when other information is transmitted and/or received from computing device 200. For example, and in various embodiments, location sensor 220 may detect a current location of 200 when a contact request is generated by computing device 200 and/or a notification is received by computing device 200. In embodiments, the location information may be provided to one or more of processor 202 for further processing, memory 204 for temporary or permanent (e.g., non-volatile) storage, or network interface 206 for transmission to another computing device. In embodiments, each user computing device of system 100 may comprise a respective location sensor 220 configured to provide location information on which one or more subsequent operations may be performed by a respective processor 202 of each user computing device.

In various embodiments, vehicle sensor 222 may be configured to detect a vehicle a vehicle proximate computing device 200. Vehicle sensor 222 may remotely capture one or more signals from the vehicle. For example, the one or more signals may comprise an optical signal (e.g., emitted and/or reflected light), a radio signal, or other signal emitted or reflected from the vehicle. Vehicle sensor 222 may generate a vehicle identifier that identifies the vehicle. The vehicle identifier may uniquely identify the vehicle. The vehicle identifier may identify one or more physical properties and/or indicia associated with the vehicle. For example, vehicle sensor 222 may comprise an image processing device configured to receive one or more images, such as from image capturing system 208 or another image sensor and detect visual information that identifies the vehicle from the one or more images. In such examples, the vehicle identifier may comprise a Quick Response (QR) code number detected from a QR code affixed to the vehicle, a bar code number detected from a bar code affixed to the vehicle, a vehicle identification number (VIN) detected from a VIN tag integrated with the vehicle, or a vehicle fingerprint detected from exterior parts of the vehicle. The vehicle fingerprint may comprise a computer-generated set of characteristics detected from the vehicle by applying the one or more images of the vehicle to an image processing device comprising a computer vision recognition computing device. In example, the image processing device may generate a vehicle identifier indicating one or more characteristics from a set of characteristics comprising a make, model, color, blemish, or other visual characteristics of the vehicle. Alternately or additionally, the vehicle identifier may indicate information may be emitted by a vehicle. For example, vehicle sensor 222 may comprise a wireless transceiver configured to detect at least one of a service set identifier (SSID) or media access control (MAC) address of a wireless device of a vehicle in accordance with a wireless signal emitted from the vehicle.

In embodiments, computing device 200 comprising vehicle sensor 222 may be mounted to another vehicle, different from the vehicle detected by vehicle sensor 222. Computing device 200 comprising vehicle sensor 222 may be mounted proximate a windshield of the other vehicle or other preferable location at which the vehicle may be detected. For example, computing device 200 with vehicle sensor 222 may be mounted in patrol vehicle 102, positioned to detect target vehicle 104.

In embodiments, computing device 200 comprising vehicle sensor 222 may be in communication with another computing device to transmit the vehicle identifier to the other computing device. The communication may comprise data communication. The communication may comprise wired or wireless communication. The communication may be provided via network interface 206. For example, computing device 200 comprising vehicle sensor 222 may be in wired or wireless communication with another computing device via network interface 206 to provide a vehicle identifier generated by vehicle sensor 222 to the other computing device.

In embodiments, vehicle sensor 222 may comprise license plate reader 224. License plate reader 224 may be configured to detect a license plate associated with a vehicle being detected. License plate reader 224 may comprise an image processing device configured to receive one or more images and detect the license plate represented in the image. Detecting the license plate may comprise generating license plate information identifying the license plate. For example, the license plate information may comprise a license plate number, a geographic region, or an issuing agency indicated on the license plate.

In embodiments, license plate reader 224 may comprise an automatic license plate reader. The automatic license plate reader may be configured to continuously generate license plate information from a sequence of images (e.g., video data) processed by license plate reader 224. Alternately or additionally, license plate reader 224 may be configured to detect a license plate responsive to one or more of an input or request to identify a vehicle as received by computing device 200. For example, computing device 200 may receive a manual input via user interface 212 or a request via network interface 206. Responsive to the input or request, vehicle sensor 222 or license plate reader 224 of vehicle sensor 222 may provide a vehicle identifier via one or more of user interface 212 or network interface 206.

In embodiments, one or more operations of vehicle sensor 222, including license plate reader 224 of vehicle sensor 222 may be performed by processor 202, executable instructions stored on memory 204, image capturing system 208, or a combination of such components of computing device 200. The operations may alternately or additionally be performed by components of two or more computing devices in communication with each other. In other embodiments, computing device 200 that includes license plate reader 224 may be integrated in a same computing device separate from other computing devices. For example, license plate reader 118 may be implemented by computing device 200 that includes vehicle sensor 222, wherein license plate reader 118 is communicatively coupled to other computing devices such as officer computing device 112.

In embodiments, vehicle sensor 222 may be optional. A system such as system 100 may be implemented without a computing device comprising vehicle sensor 222. In such embodiments, a vehicle identifier may be determined in accordance with one more inputs received via user interface 212. For example, computing device 200 corresponding to officer computing device 112 may determine a vehicle identifier entered via a keyboard, touchscreen, or other user interface device of user interface 212, independent of whether a computing device comprising a vehicle sensor (e.g., 222) is provided in communication with officer computing device 112.

In embodiments, memory 204 may store validated driver information 226. Validated driver information 226 may comprise a validation of driver information associated with a user of computing device 200. Validated driver information 226 may comprise the driver information. Validated driver information 226 may indicate the driver information has been validated by another computing device. The other computing device may comprise one or more of a remote computing device, validation authority, or reference data store. Validated driver information 226 may be provided to computing device 200 from the other computing device. For example, validated driver information 226 may comprise signed, encrypted, or otherwise processed driver information indicating that driver information identified in the validated driver information 226 has been separately verified by an authority. The validated driver information may be validated responsive to the driver information being previously provided to a computing device of the authority for validation. The signing, encryption, or other processing may indicate an authority of the signing, encryption, or processing. The signing, encryption, or other processing may indicate an authority has confirmed accuracy of driver information associated with computing device 200. The driver information may be associated with a user of computing device 200. From memory 204, validated driver information 226 may be subsequently transmitted from computing device 200 to another computing device (e.g., an officer computing device). The other computing device may process validated driver information 226 to identify the authority from which validated driver information 226 was provided. The other computing device may process validated driver information 226 to confirm accuracy of the driver information associated with validated driver information 226. For example, the other computing device may separately contact the authority from which validated driver information 226 was provided to computing device 200.

In embodiments, validated driver information 226 may be stored on a user computing device. The user computing device may comprise a motorist computing device. In other embodiments, validated driver information 226 may be optional. For example, a motorist computing device may comprise one or more components of computing device 200, independent of, or without validated driver information 226. In such embodiments, driver information may be validated by other computing devices in a system in other manners. Such manners may be less efficient than those that involve validated driver information 226, though such manners may be included in embodiments according to various aspects of the present disclosure.

FIG. 3 is a block diagram illustrating components of an example computing device 300 in accordance with various embodiments. Computing device 300 may comprise a remote computing device. For example, computing device 300 may be configured to perform one or more operations of remote computing device 110 with brief reference to FIG. 1. Alternately or additionally, computing device 300 may comprise one or more user computing devices. For example, computing device 300 may perform one or more operations of officer computing device 112 or a motorist computing device, such as passenger computing device 114 or notified computing device 120 with brief reference to FIG. 1. The accompanying description of computing device 300 may be applicable to servers, personal computers, mobile phones, smart phones, tablet computers, embedded computing devices, and other currently available or yet-to-be-developed devices that may be used in accordance with embodiments of the present disclosure.

Computing device 300 may include a processor 302 and a system memory 304 connected by a communication bus 306. Depending on the exact configuration and type of computing device, system memory 304 may comprise volatile or nonvolatile memory, such as read only memory ("ROM"), random access memory ("RAM"), EEPROM, flash memory, or other memory technology. System memory 304 may stores data and/or program modules that are immediately accessible to and/or currently being operated on by processor 302. In this regard, processor 302 may serve as a computational center of computing device 300 by supporting the execution of instructions. Processor 302 may comprise one or more processing units, as discussed further herein. System memory 304 may comprise one or more memory units, as discussed further herein. In embodiments, processor 302 may be configured to perform and/or cause computing device 300 to perform one or more operations discussed below with regards to FIGS. 4A-4B. In embodiments, processor 302 may comprise one or more features and/or be configured to perform one or more operations of processor 202 with brief reference to FIG. 2.

Computing device 300 may include a network interface 308 comprising one or more components for communicating with other devices and systems over a network. Embodiments of the present disclosure may access basic services that utilize network interface 308 to perform communications using common network protocols. Network interface 308 may comprise a communications unit, as discussed further herein.

Computing device 300 may also include a storage medium 310. Storage medium 310 may persist data locally at computing device 300. Storage medium 310 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 310 may include one or more memory units, as discussed further herein.

In embodiments, storage medium 310 may store vehicle information 312. Vehicle information 312 may comprise information indicating a relationship between one or more motorists and one or more vehicles. Vehicle information 312 may associate a vehicle with one or more persons designated to potentially drive the vehicle. Particularly, vehicle information 312 may associate a vehicle with a respective motorist computing device of each person indicated to potentially drive the vehicle. Vehicle information 312 may enable a motorist computing device of a driver of a vehicle to be identified in a secure, mediated, and/or localized manner in accordance with information about the vehicle. In embodiments, storage medium 310 may store a plurality of sets of vehicle information. Each set of the vehicle information may be associated with a different respective vehicle. For example, vehicle information 312 may comprise a first vehicle information of a plurality of sets of vehicle information stored in storage medium 310. With brief reference to FIG. 1, the first vehicle information may be uniquely associated with target vehicle 104. Storage medium 310 may further store a second vehicle information that is not associated with target vehicle 104, passenger.

In embodiments, vehicle information 312 may comprise at least one vehicle identifier that identifies a vehicle. For example, vehicle information 312 may comprise vehicle identifier 314. The vehicle identifier may uniquely identify a single vehicle. The vehicle identifier may correspond to at least one of visible indicia disposed on the vehicle. The vehicle identifier may comprise a license plate number presented on a license plate of a vehicle. For example, vehicle identifier 314 may comprise one or more alphanumeric characters and/or a geographic location indicated on license plate 124 of target vehicle 104 with brief reference to FIG. 1. Alternately or additionally, the vehicle identifier may comprise a QR code, bar code, vehicle identification number provided by a manufacturer of the vehicle, or a vehicle fingerprint of the vehicle. The vehicle fingerprint may comprise a computer-generated set of characteristics detected from the vehicle by applying one or more images of the vehicle to a computer vision recognition computing device. For example, the set of characteristics may comprise a computer-readable indication of a make, model, color, blemish, or other visual characteristics of the vehicle. Alternately or additionally, vehicle identifier 314 may comprise information emitted by a vehicle. For example, the vehicle identifier may comprise at least one of a service set identifier (SSID) or media access control (MAC) address of a wireless device integrated with the vehicle. In embodiments, vehicle information 312 may comprise a plurality of sets of vehicle identifiers. Each vehicle identifier in the plurality of sets of vehicle identifiers may indicate a different, respective vehicle to which one or more motorists and/or motorist computing devices are associated by vehicle information 312.

In embodiments, vehicle information 312 may comprise contact information associated with a motorist. The contact information may comprise information usable to communicate with a motorist computing device of the motorist. The contact information may comprise non-personal information. The contact information may not identify personal information about the motorist, such as the motorist's name, driver license number, or home address. Accordingly, the contact information may be further distinct from driver license information. In embodiments, the contact information may not include information usable for live communication with the motorist via the motorist's computing device. For example, the contact information may not include a telephone number. The contact information may comprise asynchronous contact information. The contact information may uniquely identify the motorist's computing device for asynchronous communication with a motorist computing device, independent of any unique personal information regarding a motorist associated with the motorist computing device. The contact information may enable a notification to be delivered to a user computing device. For example, contact information 316 may comprise a hardware identifier for the motorist computing device. The hardware identifier may comprise a push notification key usable to initiate transmission of a notification to a unique motorist computing device. For example, contact information 316 may comprise a push notification key by which a message may be transmitted to passenger computing device 114 with brief reference to FIG. 1. The message may be transmitted via a data, non-audio communication to the motorist computing device in accordance with the hardware identifier.

In embodiments, vehicle information 312 may comprise multiple sets of contact information. The multiple sets of contact information may be associated with a same vehicle identified by vehicle identifier 314. Each contact information (e.g., set of contact information) may be associated with a different motorist computing device. For example, vehicle information 312 may comprise contact information 316 by which a notification may be transmitted to passenger computing device 114, and further comprise contact information 318 by which the notification may alternately or additionally be transmitted to notified computing device 120 with brief reference to FIG. 1.

In embodiments, computing device 300 may also include a reference data store 320. Reference data store 320 may persist data locally at computing device 300. Reference data store 320 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Reference data store 320 may include one or more memory units, as discussed further herein. In embodiments, storage medium 310 may comprise reference data store 320, rather than reference data store 320 being provided in one or more separate computer readable storage media.

In embodiments, reference data store 320 may comprise a database of motorist-related information (e.g., driver information). The driver information may comprise reference driver information. The reference driver information may comprise driver information provided from a source (e.g., entity, agency, company, etc.) that generated the driver license information. For example, reference data store 320 may comprise insurance information. The insurance information may be provided from another computing device operated by an insurance provider. The insurance information may comprise various insurance policy information. For example, the insurance policy information may comprise one or more driver names covered by an insurance policy, a starting date for the insurance policy, an expiration date for the insurance policy, or an amount of coverage provided by the insurance policy. Reference data store 320 may comprise a set of insurance policy information for each of a plurality of insurance policies according to various aspects of the present disclosure. Computing device 300 may access the insurance information in reference data store 320 to perform various operations, including verifying at least a portion of the insurance information separately received by computing device 300.

In other embodiments, insurance policy information may be maintained at the other computing device, separate from computing device 300 but communicatively coupled to computing device 300. In such embodiments, computing device 300 may request information regarding an insurance policy from the separate device. Responsive to the request, computing device 300 may receive a portion of the insurance policy information or information indicative of the insurance policy information. The portion or indicative information may include verification that the portion of the insurance policy information is accurate and/or exists relative to information separately stored by the other computing device.

Alternately or additionally, reference data store 320 may comprise driver license information. The driver license information may comprise reference driver information. The driver license information may be provided from another computing device operated by a licensing agency. For example, the other computing device may be provided by a government entity tasked with licensing motorists (e.g., drivers). The driver license information may comprise various driver license information. For example, the driver license information may comprise a name of a motorist to which a driver license is issued, an expiration date for the driver license, a source of the driver license, an image of a face of the motorist, and/or physical descriptors of the motorist. Reference data store 320 may comprise a set of driver license information for each of a plurality of motorists (e.g., drivers) to which respective driver licenses have been issued according to various aspects of the present disclosure. Computing device 300 may access the driver license information in reference data store 320 to perform various operations, including verifying at least a portion of the driver license information separately received by computing device 300.

In other embodiments, driver license information may be retained at the other device, separate from computing device 300 but communicatively coupled to computing device 300. In such embodiments, computing device 300 may request information regarding a driver license from the other device. Responsive to the request, computing device 300 may receive a portion of the driver license information or information indicative of the driver license, including verification that the portion of the driver license is accurate and/or exists relative to information separately stored by the other computing device.

In embodiments, one or more of storage medium 310 or reference data store 320 may be disposed in one or more other computing devices, separate from computing device 300. For example, one or more of these components may be disposed in a network storage device, accessible to computing device 300 via network interface 308. In these embodiments, computing device 300 may perform one or more operations to obtain data from the one or more other devices over one or more networks. Accordingly, the one or more of storage medium 310 and reference data store 320 may be optional for computing device 300 according to various aspects of the present disclosure.

As used herein, the term "computer-readable medium" includes volatile and nonvolatile and removable and nonremovable media implemented in any method or technology capable of storing information, such as computer-readable instructions, data structures, program modules, or other data. In this regard, system memory 304, storage medium 310, and reference data store 320 depicted in FIG. 3 are examples of computer-readable media.

For ease of illustration and because it is not important for an understanding of the claimed subject matter, FIG. 3 does not show some of the typical components of many computer-based systems. In this regard, computing device 300 may include input devices, such as a keyboard, keypad, mouse, trackball, microphone, video camera, touchpad, touchscreen, electronic pen, stylus, and/or any other input device described herein. Such input devices may be coupled to computing device 300 by wired or wireless connections including radio frequency (RF), infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 300, or can be integral components of computing device 300. In some embodiments, multiple input devices may be combined into a single, multifunction input device (e.g., a touchscreen).

Computing device 300 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computing device 300, or can be integral components of computing device 300. Input functionality and output functionality may be integrated into the same input/output device (e.g., a touchscreen). A suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

In various embodiments, a "memory" or "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein, unless specified otherwise, may include relational, hierarchical, graphical, distributed ledger, blockchain, object-oriented structure, and/or any other database configurations, unless otherwise specified. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

A database, system, device, server, or other components of the system described herein may comprise a combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

In various embodiments, a method of establishing a location-based communication session may be provided. For example, and with brief reference to FIG. 4A and FIG. 4B, method 400 may comprise one or more operations for establishing a location-based communication session between a motorist computing device and an officer computing device according to various aspects of the present disclosure. For example, method 400 may comprise one or more operations of request client 410, provide client 412, upload vehicle information 414, upload driver information 416, validate driver info 418, transmit validation 420, capture vehicle identifier 422, submit contact request 424, identify motorist computing device(s) 426, send notification(s) 428, compare location 430, compare location 432, display notification 434, display notification 436, accept request 438, establish communication 440, conduct communication session 442, transmit validated driver information 444, receive driver information 446, generate electronic ticket 448, transmit electronic ticket 450, confirm ticket 452, enter payment information 454, or transmit payment information 456 according to various aspects of the present disclosure.

In embodiments, one or more operations of method 400 may be performed by one or more computing devices. The computing devices may comprise one or more user computing devices. The computing devices may comprise at least one remote computing device. For example, the one or more operations may be performed by one or more computing devices of system 100, computing device 200, computing device 300, or combinations thereof with brief reference to FIG. 1-3. In embodiments, method 400 may be performed in part by a user computing device (e.g., first computing device) disposed at patrol vehicle 402 (e.g., a first vehicle). For example, the user computing device may comprise officer computing device 112 with brief reference to FIG. 1. In embodiments, method 400 may be performed in part by remote computing device 406 (e.g., second computing device) disposed at a remote location. For example, remote computing device 406 may comprise or correspond to remote computing device 110 with brief reference to FIG. 1. In embodiments, method 400 may be performed in part by another user computing device (e.g., third computing device) disposed at another vehicle, target vehicle 404 (e.g., a second vehicle). For example, the other user computing device may comprise passenger computing device 114 with brief reference to FIG. 1. In embodiments, method 400 may be performed in part by a further user computing device (e.g., fourth computing device) disposed at remote location 408. Remote location 408 may be different from a remote location at which remote computing device 406 is disposed. The computing device at remote location 408 may comprise notified computing device 120 and/or remote location 408 may correspond to remote location 122 with brief reference to FIG. 1. In some embodiments, patrol vehicle 402 may comprise or correspond to patrol vehicle 102, target vehicle 404 may comprise or correspond to patrol vehicle 102, and/or a network by which the request is transmitted may comprise or correspond to network 106. Further example embodiments may include fewer or additional computing devices, user computing devices, motorist computing devices, and remote computing devices according to various aspects of the present disclosure.

Figure 4A:
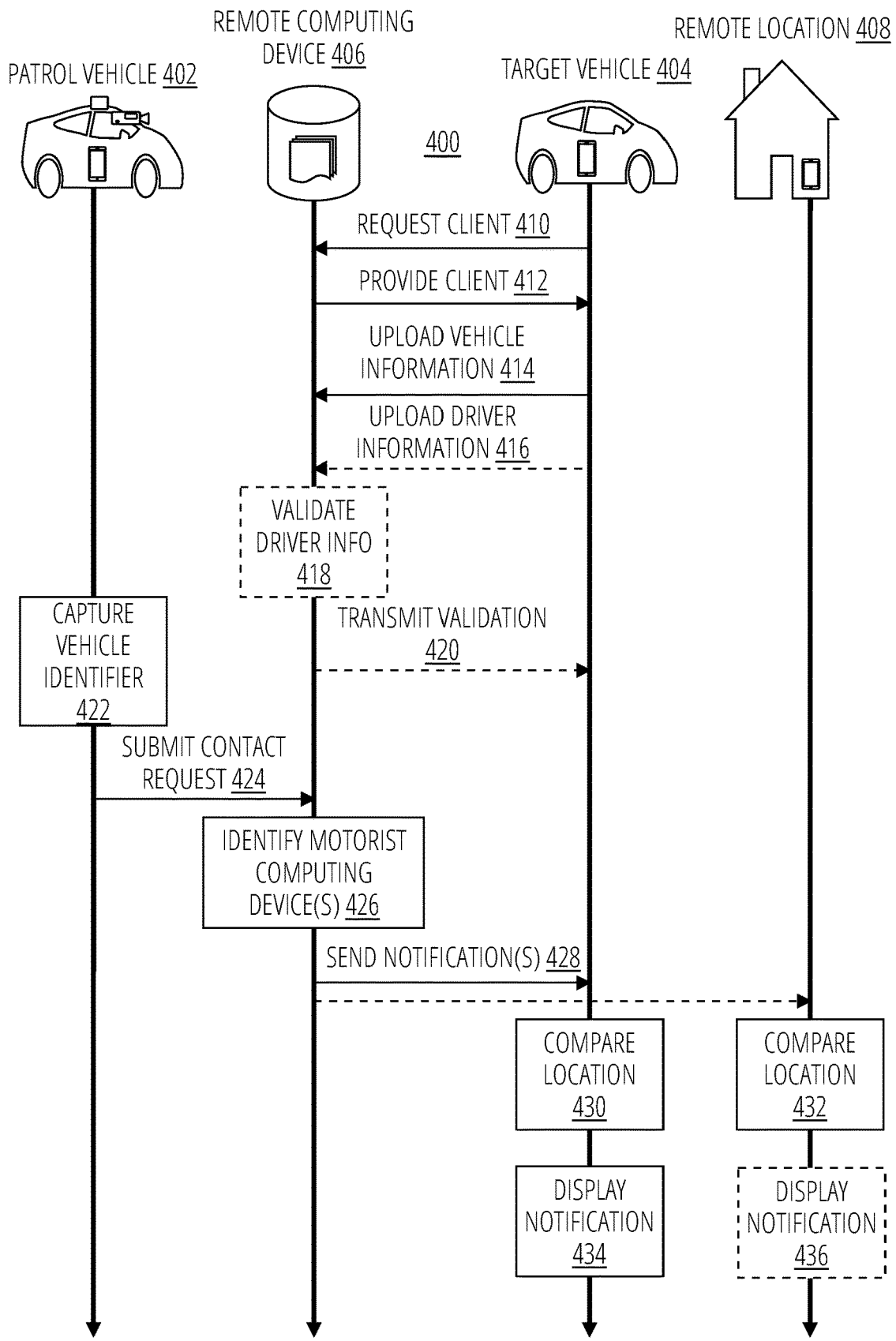
FIGS. 4A and 4B is a lane diagram of an exemplary process flow for a method of establishing a location-based communication session in accordance with various embodiments.
Figure 4B:
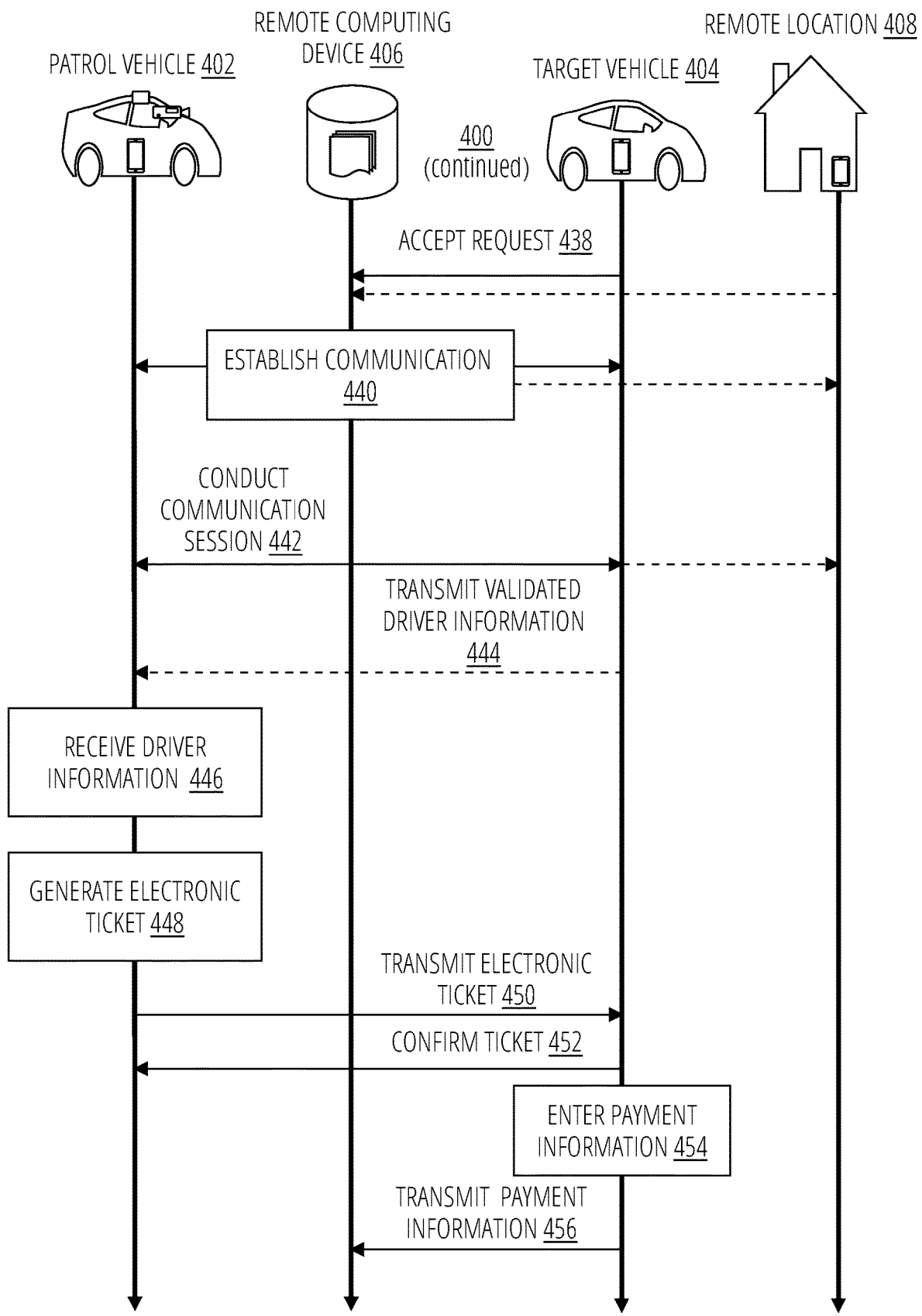

FIGS. 4A-4B comprise a lane diagram by which operations of a respective computing device may be indicated by a vertical arrow below the respective computing device (e.g., computing device associated with patrol vehicle 402, computing device associated with target vehicle 404, remote computing device 406, computing device associated with remote location 408, etc.). Interactions, including information transmitted and/or received by a given computing device are indicated by lateral arrows in FIG. 4A and FIG. 4B. In embodiments, an example sequence of operations, where one operation may be performed after, responsive to, or in accordance with another operation, may be performed chronologically from a top of each of FIG. 4A and FIG. 4B to a respective bottom of each figure. Further, FIG. 4B may represent a continuation of a process flow initiated on FIG. 4A. An operation at the top of FIG. 4B may be performed after, including sequentially after, an operation illustrated at a bottom of FIG. 4A.

In embodiments, requesting a client application (e.g., request client 410) may be performed. Requesting a client application may comprise transmitting a request over a network to download an application. Requesting the client application may be performed by a user computing device. For example, a first motorist computing device, such as a passenger computing device, may request the client application. The passenger computing device may be associated with a vehicle. For example, the passenger computing device may be associated with target vehicle 404. In embodiments, one or more of an officer computing device and a second motorist computing device (e.g., a notified computing device) may each additionally request the client application (not shown). Requesting the client application may comprise transmitting the request to a remote computing device. In embodiments, requesting the client application may be performed prior to occurrence of an event.

In embodiments, providing the client application (e.g., provide client 412) may be performed. The client application may be provided to the user computing device from a remote computing device. For example, the client application may be provided from at least one of remote computing device 406 or an app store associated with remote computing device 406 over a network. Providing the client application may comprise transmitting the client application to a same computing device (e.g., a motorist computing device) from which a request to download the client application was received.

In embodiments, requesting a client application and providing the client application may be performed for other user computing devices as well. For example, an officer computing device associated with patrol vehicle 402 may request a client application and, responsive to the request, receive the client application as well from a remote computing device. In some embodiments, the client application provided to an officer computing device may be different from the client application provided to a motorist computing device. The different client applications may include different functions, such as being able to issue a contact request and response to a notification request, among other different operations discussed below with regards to user computing devices associated with each of patrol vehicle 402, target vehicle 404, and remote location 408.

In embodiments, uploading vehicle information (e.g., upload vehicle information 414) may be performed to enable a motorist computing device to be subsequently identified for an event. Uploading the vehicle information may comprise providing a logical association (e.g., connection, link, association, etc.) between at least one motorist computing device and a vehicle. The logical association may be indicated by the vehicle information. The vehicle information may comprise a vehicle identifier of a vehicle. For example, the vehicle information may comprise a license plate number or other vehicle identifier of target vehicle 404. The vehicle information may further comprise contact information associated with one or more motorist computing devices. For example, the contact information may comprise a hardware identifier associated with each motorist computing device of the one or more motorist computing devices. The vehicle information may comprise vehicle information 312 with brief reference to FIG. 3. The logical association may indicate that a user of a motorist device may be a same person as a driver of a vehicle identified via the vehicle information.

In embodiments, the vehicle information may be uploaded from a same motorist device identified in accordance with contact information in the vehicle information. Alternately or additionally, the vehicle information may be uploaded from a separate computing device, different from the one or more motorist computing devices identified by the vehicle information. Uploading the vehicle information may be performed prior to a contact request comprising the vehicle identifier may be received by a remote computing device in embodiments according to various aspects of the present disclosure.

In embodiments, uploading the vehicle information may comprise storing the vehicle information on a remote computing device for subsequent access. For example, computing device 300 may store vehicle information 312 uploaded in accordance with an operation to upload vehicle information 414 with brief reference to FIG. 3.

In embodiments, uploading driver information (e.g., upload driver information 416) may be performed to enable information associated with an event to be efficiently received and reviewed. Uploading the driver information may comprise transmitting one or more of insurance information and/or driver license information. The uploaded driver information may match one or more sets of reference driver information. For example, the driver information may comprise a single instance or set of driver information corresponding to a plurality of subsets of driver information stored in reference data store 320. The set of driver information may comprise driver information for a single user, while the subsets of driver information may comprise, for example, driver license information for the user, insurance information identifying the user as a driver covered by an insurance policy, and/or insurance information for a vehicle that may be driven by the same user. The driver information may be transmitted to a remote computing device. For example, the driver information may be transmitted to remote computing device 406 from a user computing device. The user computing device may comprise a motorist computing device (e.g., passenger computing device 114) or another user computing device. Uploading the driver information may comprise one or more of entering information in form fields of a client application, transmitting an image representing the driver information, uploading a file indicative of the driver information. The driver information may comprise a unique identifier. For example, the driver information may comprise at least one of an insurance policy number or a driver license number. The driver information may further include personally identifying information, such as a name of one or more motorists. For example, an operation to upload driver information 416 may comprise a motorist transmitting an image of their driver's license and insurance card to remote computing device 406.

In embodiments, the driver information may be temporarily stored on the remote computing device. The driver information may be stored to enable subsequent operations to be performed, such as validation of the driver information, but deleted from the remote computing device upon completion of the operations. Such an arrangement may improve security of information represented in the driver information. Accordingly, vehicle information 312 stored in storage medium 310 may not comprise uploaded driver information according to various aspects of the present disclosure.

In embodiments, validating driver information (e.g., validate driver info 418) may be performed. The validating may be performed by one or more remote computing devices. For example, one or more of remote computing device 406 and computing device 300 may perform one or more operations to validate driver information received from a motorist computing device. Validating the driver information may be performed responsive to uploaded driver information. Validating the driver information may comprise extracting applying one or more document recognition modules to uploaded driver information. For example, a document type detector may be applied to an uploaded image to detect one or more of a driver license or an insurance card represented in the uploaded image. Alternately or additionally, an optical character recognition operation may be applied to the uploaded driver information (e.g., document, image, or other file) to generate text data corresponding to one or more alphanumeric characters represented in the driver information. In some embodiments, an image extraction module may be applied to the driver information to extract visual indicia from the driver information. For example, validating driver information may comprise detecting visual indicia comprising one or more of a logo associated with an entity that issued the driver information, a photo of a face of a motorist in the driver information, or machine-generated descriptors of such indicia.

In embodiments, an operation to validate driver information 418 may comprise verifying the driver information. The driver information may be verified by performing one or more logical operations on uploaded driver information. For example, the logical operations may comprise one or more logical operations to confirm that required portions of the driver information have been uploaded. Uploaded vehicle information that does not include the required portions may not be validated responsive to performing the one or more logical operations. Alternately or additionally, the logical operations may comprise checking for one or more patterns in the uploaded driver information. For example, a valid driver license number may comprise a predetermined pattern of sequential letters and numbers. Verifying the driver information may comprise comparing uploaded driver information to the predetermined sequence to determine the uploaded driver information does or does not include the predetermined pattern. Alternately or additionally, the driver information may be verified relative to information in a reference data store. The information may comprise reference driver information. Verifying the driver information may comprise comparing the driver information to reference driver information. The uploaded driver information may be received by a computing device from a computing device associated with a person to which the driver information was issued. In contrast, the reference driver information may be provided to the computing device from the source that issued the reference driver information. For example, computing device 300 may receive or access reference driver information stored in reference data store 320. The reference driver information may be received via network interface 308 prior to driver information being uploaded in accordance with the operation to upload driver information 416. Comparing the driver information (e.g., uploaded driver information) to the reference driver information may comprise querying the reference driver information with the driver information. For example, processor 302 may perform an operation to compare uploaded driver information with one or more sets of driver information stored in reference data store 320.

In embodiments, validating driver information may comprise detecting valid driver information or invalid driver information in accordance with the comparing (e.g., performing a comparison). Driver information that matches a set of driver information among a plurality of sets of driver information in the reference driver information may comprise valid driver information in accordance with the comparing. Driver information that does not match a set of driver information among a plurality of sets of driver information in the reference driver information may comprise invalid driver information.

In embodiments, validating the driver information may comprise storing contact information responsive to verifying driver information. The contact information may be associated with the validated driver information. The contact information may be associated with a user computing device of a user and the validated driver information may identify the same user. The contact information may be stored responsive to detecting valid driver information. For example, first contact information 316 may be stored in storage medium 310 responsive to driver information associated with contact information 316 being verified with brief reference to FIG. 3. First contact information 316 may be stored in storage medium 310 after driver information associated with contact information 316 has been compared with reference driver information stored in data store 320 to detect valid driver information. Storing contact information responsive to verifying associated driver information may improve accuracy and reliability of one or more subsequent operations of method 400. Responsive to detecting invalid driver information, one or more operations of method 400 may end. For example, validating 418 may end without storing contact information in a storage medium when invalid driver information is detected. Validating 418 may end and subsequent operations of method 400 may not be performed when invalid driver information is detected according to various aspects of the present disclosure.

In embodiments, validating the driver information may comprise generating a validation in accordance with detecting valid driver information. The validation may comprise a set of information (i.e., information that may be stored on computer-readable storage medium and transmitted via network interface). The validation may identify the driver information to which one or more operations for verifying the driver information has been applied. The validation may comprise text data identifying the valid driver information. The validation may comprise information that may indicate the driver information comprises valid driver information. The validation may comprise validated driver information (e.g, validated driver information 226). For example, the validation may comprise one or more of a signed driver information, a validation key, or a digital certificate. A computing device may apply a signature to the valid driver information, encrypt the driver information, generate the validation key based on the driver information, generate the certificate based on the driver information, and/or otherwise process the valid driver information to generate the validation. Such processing may indicate an authority of the signing, encryption, or processing. The signing, encryption, or other processing may indicate the driver information has been detected to be accurate in accordance with reference driver information from an authority or issuer of the valid driver information. The validation may enable the driver information to be subsequently accessed. The validation may enable the validated driver information to be securely decrypted and/or otherwise decoded by an officer computing device. The validation may enable the driver information to be subsequently identified as validated. For example, a motorist computing device may transmit the validation to an officer computing device and, in accordance with the validation, the officer computing device may receive or access the driver information. In accordance with the validation, the officer computing device may detect that an operation to validate the driver information 418 had been previously performed. The validation may enable efficient acquisition of the driver information during an event, relative to other manners of acquisition such as manual entry of the driver information. The validation may enable the driver information to be securely provided to an officer computing device without storing or otherwise providing driver information to a remote computing device after the validation is generated by the remote computing device. The validation may enable a veracity of driver information associated with the validation to be determined at the officer computing device. In some embodiments, the validation may render subsequent lookup of the driver information relative to reference driver information to be avoided (i.e., unnecessary). In some embodiments, the validation may enable driver information from a motorist computing device to be provided without the driver information being separately transmitted via audio or voice communication between a motorist computing device and officer computing device.

In embodiments, validating the driver information may comprise generating an error notification in accordance with invalid driver information. The notification may indicate that previously uploaded information has not been verified relative to reference driver information and/or an operation to validate driver information 418 has failed. A validation may not be generated or otherwise provided in accordance with invalid driver information being detected. Responsive to the invalid driver information, the error notification may be transmitted to a computing device from which driver information was received and validating validate driver information 418 may terminate.

In embodiments, transmitting a validation (e.g., transmit validation 420) may be performed. The transmitting may provide the validation to a computing device from which driver information associated with the validation was received. For example, remote computing device 406 may transmit the validation to a motorist computing device. Transmitting the validation may comprise deleting the driver information from the computing device by which the validation was generated. Accordingly, driver information may be available within system 100 upon occurrence of an event without storing such driver information on remote computing device 106 with brief reference to FIG. 1.

In embodiments, uploading driver information, validating driver information, and transmitting a validation (e.g., operations 414-418) may be optional. Methods, systems, and devices may be configured to perform location-based communication independent of driver information being uploaded and validated by computing device. In such embodiments, the driver information may be exchanged in other manners, including as part of a communication session established between two or more user computing devices.

In embodiments, uploading driver information, validating driver information, and transmitting a validation (e.g., operations 414-418) may be performed prior to an event. For example, a passenger computing device associated with target vehicle 404 may have received a validation of driver information prior to a traffic stop. Alternately or additionally, one or more of these operations may be performed independent of a location of the event. For example, the passenger computing device may upload driver information and receive a validation while the passenger computing device is located at remote location 408. The passenger computing device may perform these operations prior to the passenger computing device being disposed in target vehicle 404.

In embodiments, capturing a vehicle identifier (e.g., capture vehicle identifier 422) may be performed. Capturing the vehicle identifier may be performed by an officer computing device. For example, an officer computing device disposed in patrol vehicle 402 may capture the vehicle identifier 314. Capturing the vehicle identifier may comprise activating a vehicle sensor. For example, license plate reader 118 may be controlled to capture an image of license plate 124 and detect a license plate number represented on the license plate 124. Capturing the vehicle identifier may comprise transmitting a vehicle identifier to officer computing device 112 to capture the vehicle identifier by the officer computing device. Capturing the vehicle identifier may comprise receiving the vehicle identifier from a vehicle sensor. For example, license plate reader 118 may transmit a vehicle identifier to officer computing device 112 to capture the vehicle identifier by the officer computing device. License plate reader 118 may automatically transmit the vehicle identifier to officer computing device 112 upon detection of the vehicle identifier. In some embodiments, the vehicle identifier may receive the vehicle identifier via a user interface of a user computing device, such as user interface 212 of a user computing device comprising computing device 200. Capturing the vehicle identifier may comprise receiving the vehicle identifier via the user interface of the officer computing device. Capturing the vehicle identifier may comprise storing the vehicle identifier on the officer computing device for subsequent processing.

In embodiments, capturing the vehicle identifier may comprise detecting a location of the user computing device at which the vehicle identifier is physically located. The location may comprise an event location. The location may indicate a geographical location at which an event occurs. For example, capturing a vehicle identifier may comprise detecting location 128 of an event. The location may be detected via location sensor integrated with an officer computing device. Alternately or additionally, the location may be provided from another local computing device, such as a vehicle sensor. The location may be provided to an officer computing device with a vehicle identifier concurrently captured by a vehicle sensor. Capturing the vehicle identifier may comprise storing the vehicle identifier on the officer computing device for subsequent processing. The location may be detected via a location sensor. For example, a computing device 200 comprising location sensor 220 may detect the location and provide the location for subsequent operations performed by the computing device with brief reference to FIG. 2.

In embodiments, submitting a contact request (e.g., submit contact request 424) may be performed. The contact request may comprise an electronic contact request. The contact request may indicate a user of the officer computing device would like to communicate via user computing devices regarding the event. The contact request may be submitted responsive to capturing a vehicle identifier. The contact request may be submitted by an officer computing device. For example, officer computing device 112 may submit a contact request with brief reference to FIG. 1. The officer computing device may be submitted while the officer computing device is positioned at vehicle Submitting the contact request may comprise receiving the contact request at a remote computing device. For example, remote computing device 406 may receive the contact request over a network. The contact request may automatically be directed toward the remote computing device by a client application installed on the officer computing device. The contact request may be submitted independent of, or without, an indication of whether a user computing device is disposed in target vehicle 404. The contact request may be submitted independent of, or without, the computing device from which the contact request is submitted exiting a vehicle (e.g., a patrol vehicle) or being disposed external to the vehicle. The contact request may be submitted independent of, or without, a direct, in-person interaction between a user of the officer computing device and passenger(s) of the stopped vehicle associated with the contact request, enabling a contactless event to be initiated.

In embodiments, the contact request may comprise a vehicle identifier. The vehicle identifier may comprise a vehicle identifier captured by the computing device from which the contact request is submitted. For example, officer computing device 112 may submit a contact request comprising a license plate number detected by license plate reader 118 with brief reference to FIG. 1. The vehicle identifier may enable a vehicle involved with an event to be subsequently identified by one or more other computing devices, as well as users of such computing devices upon display of the vehicle identifier at the respective computing devices. In embodiments, the contact request may comprise a location. The contact request may comprise location information identifying the location. The location may comprise the location of the computing device from which the contact request is submitted. For example, officer computing device 112 may detect a location of officer computing device 112 using a location sensor communicatively coupled with officer computing device and include this location in a contact request. The location may comprise the location of an event at which officer computing device 112 is located. The location may enable one or more of a motorist computing device and a vehicle involved with an event to be subsequently identified by one or more other computing devices, as well as users of such computing devices upon display of the location at the respective computing devices.

In embodiments, the contact request may comprise an officer identifier. The officer identifier may comprise officer information associated with the computing device from which the contact request is submitted. For example, an officer may provide their name, badge number, or other unique identified to officer computing device 112 via a user interface of the officer computing device. The officer identifier may alternately or additionally include a device identifier associated with the officer computing device. The device identifier may enable one or more responses to the contact request to be delivered to the officer computing device. The officer identifier may also enable a source of the contact request at an event to be subsequently identified by one or more other computing devices, as well as users of such computing devices upon display of the officer identifier at the respective computing devices. In embodiments, the officer identifier may lack a phone number or other video or audio communication that may enable communication to be initiated with the officer computing device, absent a contact request being submitted as disclosed herein.

In embodiments, identifying a motorist computing device (e.g., identify motorist computing device(s) 426) may be performed. The identifying may be performed responsive to a contact request. For example, remote computing device 406 may identify a motorist computing device responsive to receiving a contact request from an officer computing device disposed at patrol vehicle 402. Identifying the motorist computing device may comprise identifying at least one motorist computing device.

In embodiments, identifying the motorist computing device may be performed in accordance with a vehicle identifier included in a contact request. The vehicle identifier may be extracted from the contact request. The vehicle identifier may be compared to a set of vehicle identifiers. For example, a remote computing device comprising computing device 300 may query a data store comprising vehicle information 312 using the vehicle identifier from the contact request. The vehicle identifier may be compared to stored vehicle information to detect whether a vehicle information comprises the vehicle identifier. In accordance with the query and/or comparison, a vehicle information, such as vehicle information 312, comprising the vehicle identifier from the contact request may be identified.

In embodiments, identifying the motorist computing device may comprise identifying a contact information related to the vehicle identifier. The contact information may be associated with the motorist computing device. In accordance with a comparison between a vehicle identifier and data store comprising a plurality of sets of vehicle information, a vehicle information comprising the vehicle identifier may be identified. The vehicle information may logically associate the vehicle identifier with contact information. The contact information may be related to the vehicle identifier in accordance with the previously stored vehicle information subsequently identified. For example, a contact request may comprise a vehicle identifier determined to match vehicle identifier 314 and, in accordance with vehicle information 312 comprising vehicle identifier 314 and contact information 316, contact information comprising contact information 316 may be identified as associated with the contact request. Identifying the motorist computing device may comprise determining the contact request is not associated with other stored vehicle information. For example, a contact request determined to match vehicle information 312 may be determined to not correspond to other vehicle information, such as vehicle information 322 with brief reference to FIG. 3. Vehicle information 322 may comprise a different vehicle identifier relative to a vehicle identifier included in a contact request determined to match vehicle information 312.

In embodiments, identifying the motorist computing device may comprise identifying two or more motorist computing devices. The two or more motorist computing devices may comprise at least two motorist computing devices. Each of the two or more motorist computing devices may be associated with motorist previously identified as a potential driver. For example, each of contact information 314 and contact information 316 may be associated with motorist computing devices belonging to (e.g., used by, associated with, assigned to, etc.) different motorists that may drive target vehicle 404. Each of the two or more motorist computing devices may be related to a vehicle identifier included in a contact request. Each of the two or more motorist computing devices may be identified in accordance with a vehicle information comprising the vehicle identifier and contact information associated with each of the two or more motorist computing devices. Identifying the two or more motorist computing devices may comprise identifying a vehicle information comprising a vehicle identifier included in a contact request, wherein the vehicle information further comprises respective contact information associated with each of the two or more motorist computing devices.

In embodiments, sending one or more notifications may be (e.g., send notification[s] 428) performed. The one or more may be sent responsive to at least one motorist computing device being identified. The one or more notifications may be sent to the at least one motorist computing device in accordance with at least one contact information identified to be associated to a vehicle identifier included in a contact request. For example, a notification may be transmitted to each of a passenger computing device at target vehicle 404 and a notified computing device at remote location 408. The passenger computing device and the notified computing device may be associated with two sets of contact information related to a vehicle identifier included in a contact request received from an officer computing device at patrol vehicle 402. The one or more notifications may be sent from a remote computing device, such as remote computing device 406, that received a contact request. The contact information may continue to be withheld from a source of the contact request, such as an officer computing device. Accordingly, the remote computing device may mediate communication between the source of the contact request and the at least one motorist computing device identified relative to the contact request.

In embodiments, sending the notification may be limited to motorist computing devices associated with the vehicle identifier in the stored vehicle information. Another user computing device proximate the location of the event may not receive the notification in accordance with the other user computing device not being registered in the vehicle information with the vehicle identifier. Accordingly, sending the notification in accordance with the vehicle identifier may preclude broadcasting the notification within an area proximate the location of the event. The sending may further enable a notification to be sent to a notified computing device, not proximate the location of the event that is related to the vehicle identifier.

In embodiments, the one or more notifications may include a location. The location may include a location of an event. The location may comprise location information that identifies a location of the event. The location may comprise a location received in a contact request. For example, a contact request transmitted from an officer computing device at patrol vehicle 402 may be included in each of a first notification transmitted to a first motorist computing device (e.g., a passenger computing device) at target vehicle 404 and a second motorist computing device at remote location 408 (e.g., a notified computing device). By including the location, each motorist computing device that receives the notification may locally compare the location with the respective location of the motorist computing device. The respective location of each motorist computing device may not be previously transmitted or otherwise identified by other computing devices, aside from the respective motorist computing device. Transmitting the one or more notifications may be performed independent of a location of each motorist computing device to which the notifications are transmitted. Accordingly, transmitting the at least one notification may be performed in a manner that preserves privacy of a location of each motorist computing device to which the notification is received. A same notification may be transmitted to each identified motorist computing device, independent of whether the respective motorist computing device is positioned in a target vehicle (e.g., target vehicle 404) during an event. Remote computing device 406 may not receive information identifying a current location of a motorist computing device according to various aspects of the present disclosure.

In embodiments, each motorist computing device that received a notification may determine their location relative to the event. Determining their location may comprise comparing their respective location relative to the event. For example, a first motorist computing device may perform an operation to compare its location (e.g., compare location 430) relative to the event and a second motorist computing device may perform an operation to compare its location (e.g., compare location 432) relative to the event. Comparing the location at each motorist computing device to which a notification is transmitted may comprise detecting the respective location of the motorist computing device. For example, a motorist computing device may determine its location using a location sensor integrated with the motorist computing device. The comparing may be performed responsive to receiving a notification. The comparing may comprise determining whether a location in the notification is within a threshold distance of its location. For example, the comparing may comprise determining whether the received location is within 100 feet, within 75 feet, or within 50 feet of the location detected at the motorist computing device. The comparing may indicate the respective motorist computing device is located at the event or not located at the event. A motorist computing device determined to not be located at the event may comprise a notified computing device. A motorist computing device determined to be located at the event may comprise a passenger motorist computing device.

In embodiments, the threshold distance may be selected in accordance with an event. For example, a traffic stop may be associated with a maximum distance between a user computing device in a patrol vehicle and another user computing device in a target vehicle. The threshold distance may be different for different types of events. In embodiments, the threshold distance may be indicated in a notification, including as determined relative to a contact request by a remote computing device, and used as part of a comparison between a location in a notification and a location locally detected by a motorist computing device.

In embodiments, each motorist computing device that received a notification may selectively display the notification. The selective displaying may be performed in accordance with a location of the respective motorist computing device. For example, a motorist computing device comprising a passenger computing device may display the notification. A passenger computing device disposed at target vehicle 404 may display the notification. The notification may be displayed by the passenger computing device in accordance with the passenger computing device determining a location in the notification is within a threshold distance of its own location. Alternately or additionally, motorist computing device comprising a notified computing device may not display (e.g., ignore, discontinue processing, etc.) the notification. A notified computing device disposed at remote location 408 may not display the notification. The notification may be ignored by the notification computing device in accordance with the notified computing device determining a location in the notification is beyond a threshold distance of its own location. Not displaying the notification may comprising receiving and stopping processing of the notification without providing an alert from the motorist computing device regarding the notification.

In embodiments, displaying a notification at a motorist computing device may be further performed in accordance with a configuration of the motorist computing device. The configuration may be determined prior to receipt of a notification. For example, configuration information may be stored in a storage medium on a motorist computing device prior to receipt of the notification and, upon the receipt of the notification, accessed by a processor of the motorist computing device to determine whether subsequent is applied to the notification. In embodiments, the configuration may indicate whether a motorist computing device comprising motorist computing device should further process a notification or discontinue processing a notification. The configuration may enable a user associated with a motorist computing device to selectively join a communication session associated with another motorist computing device of another user that may also drive a same vehicle, such as a family member or coworker. For example, a parent associated may prefer to join a communication session that involves their child or other family member located at an event, despite themselves not being located at the event, and thus configure their respective motorist computing device to display all notifications. However, the child may decline to join a communication session involving their parent located at the event and, as such, the child may configure their respective motorist computing device to ignore a notification that is associated with a location at which they are not located. In embodiments, the motorist computing device may process the notification to display the notification or not display the notification. Accordingly, an operation to display a notification 436 at a notified computing device may be optional in embodiments according to various aspects of the present disclosure.

In embodiments, displaying the notification may comprise providing the notification via a user interface device of a motorist computing device. For example, an alert comprising a push notification may be displayed on a touchscreen of a motorist computing device. Providing the notification may alternately or additionally comprise generating an audible alert output via an audio output device or a haptic alert via a haptic output device. For example, a passenger computing device at target vehicle 404 may display the notification while zero or more of an audible alert or a haptic alert are concurrently generated by the passenger computing device, indicating the notification. Providing the notification via the user interface may comprise displaying information regarding the event. For example, providing the notification may comprise displaying one or more of an officer identifier and a type of the event. The information regarding the event may be included in the notification and extracted from the notification to be provided for display.

In embodiments, accepting a request (e.g., accept request 438) may be performed. The request may be accepted at a motorist computing device. The request may be accepted by each motorist computing device to which a notification was transmitted. Accepting the request may indicate a user associated with a given motorist computing device is willing to participate in a communication session via the motorist computing device. For example, a passenger computing device at target vehicle 404 may accept a request. Additionally, a notified computing device at a remote location may accept a request responsive to a selectively displayed notification as well.

In embodiments, accepting a request may comprise transmitting a request acknowledgment to another computing device. The request acknowledgment may identify one or more of the notification received by the motorist computing device, the contact request associated with the notification, and the motorist computing device. The other computing device may comprise a remote computing device from which a notification was received. For example, one or more of a motorist computing device at each of target vehicle 404 and remote location 408 may transmit a respective acknowledgement to remote computing device 406. A notification displayed at the motorist computing device may provide an input by which the contact request associated with the notification may be accepted. For example, a displayed notification may comprise an input button or other graphical user interface that may be activated by a user of a motorist computing device to cause the request to be accepted. Responsive to the input received at the motorist computing device after the notification is displayed, an acknowledgment of the notification may be transmitted by the motorist computing device to accept the request.

In embodiments, establishing communication between user computing devices (e.g., establish communication 440) may be performed. The communication may comprise a communication session between the user computing devices. Establishing the communication may comprise providing a communication channel between the user computing devices through which two-way communication may be established. The communication may be established by a remote computing device. The communication may be established responsive to an acknowledgement received from a motorist computing device. For example, remote computing device 406 may establish the communication directly and/or instruct another remote computing device, such as a communication server, to establish the communication session. The user computing devices may include an officer computing device from which a contact request was transmitted. The user computing devices may include at least one motorist computing device to which a notification was previously transmitted. The user computing devices may include at least one motorist computing device from which a response was received indicating the request is accepted by the motorist computing device.

In embodiments, the communication may comprise audiovisual communication. For example, audio and video may be respectively captured by an audio input device and image capture device integrated with each user computing device and transmitted to one or more other computing devices with which the communication is conducted. The audiovisual communication may enable a user of each computing device to speak and see another user another user computing device with which the communication is conducted. Alternately or additionally, the communication may comprise at least audio data transmitted from an officer computing device or motorist computing device.

In embodiments, the communication may further enable non-audiovisual information to be exchanged. For example, at least file comprising one or more of validated driver information and driver information may be transmitted from a motorist computing device to an officer computing device as part of a communication session. Transmitting the validated driver information (e.g., transmit validated driver information 444) may be performed by a passenger computing device. For example, a passenger computing device at target vehicle 404 may transmit validated driver information responsive to accepting a contact request. The passenger computing device at target vehicle may transmit a validation comprising validated driver information to an officer computing device when the validation is previously received by the passenger computing device. The validated driver information may be transmitted automatically with an acknowledgement request. Alternately, the validated driver information may be transmitted from the motorist computing device in accordance with an input received at the motorist computing device. For example, a client application installed at a passenger computing device may provide a graphical user interface element that, when selected via a manual user input, causes validated driver information previously stored on the motorist computing device to be transmitted. The validated driver information may be transmitted to an officer computing device via a network connection between a motorist computing device and the officer computing device. The validated driver information may be transmitted separately from remote computing device 406 (e.g., bypassing, not being provided through remote computing device 406, etc.), In embodiments, conducting a communication session (e.g., conduct communication session 442) may be performed. The communication session may be conducted responsive to, and in accordance with, establishing the communication session. The communication session may comprise a period of time in which communication data that includes video data, audio data, or audiovisual data may be exchanged between two or more user computing devices. The two or more user computing devices may comprise at least one officer computing device and at least one computing device. For example, an officer computing device at patrol vehicle 402, a passenger computing device at target vehicle 404, and a notified computing device at remote location 408 may transmit and receive communication data to conduct the communication session. The communication session may enable information to be provided from the target vehicle 404 to an officer computing device at patrol vehicle 402. The communication session may enable this information to be provided electronically, rather than in-person between an officer and a driver at a window of the target vehicle. The communication session may further enable a remote user, such as a user associated with a notified computing device at remote location 408, to receive communication and provide communication to user computing devices at each of the patrol vehicle and target vehicle during the communication. The communication session may be concurrently conducted with other operations of method 400, including one or more of operations 446-452. The communication session may enable a driver of the target vehicle to be observed via the officer computing device. Such an observation may confirm the passenger computing device is associated with the driver rather than another passenger of the computing device. The communication session may also enable users at each of the officer computing device and at least one motorist computing device to discuss the event. The communication session may enable information to be exchanged between users at each of patrol vehicle 402 and target vehicle 404, as well as remote location 408, while precluding a need for direct In embodiments, receiving driver information (e.g., receive driver information 446) may be performed. Receiving the driver information may comprise receiving an image in which the driver information may be represented. For example, receiving driver information may comprise capturing a driver license and an insurance card in video data transmitted from a passenger computing device. Receiving driver information may alternately or additionally include capturing an image of a driver of the target vehicle. The image of the driver may enable an identity of the driver to be compared to other information at the officer computing device. For example, the image of the driver may be compared with an image from a driver license. The comparing may be performed manually and/or in accordance with applying each of the captured image of the driver and the image from the driver license to an image processing module configured to indicate whether the images represent a same person or different persons. Receiving driver information may comprise displaying a captured image of the driver next to an image of the driver license on a display of the officer computing device. Alternately or additionally, receiving the driver information may comprise receiving audio data from a motorist computing device (e.g., passenger computing device) in which the driver information has been captured. For example, a driver associated with a passenger computing device may read a driver license number or insurance policy number aloud to cause audio data that includes one or both numbers to be received at an officer computing device.

In embodiments, (e.g., generate electronic ticket 448) may be performed. The electronic ticket may be generated at an officer computing device. The electronic ticket may be generated using a client application installed on the officer computing device. The electronic ticket may include information regarding the event. The information may be same or different information regarding the event previously transmitted in a notification to a motorist computing device. The information regarding the event may indicate a statutory basis for the event. For example, the information regarding the event may include an observed speed of the vehicle, a maximum speed of an area in which the speed was observed, and an offense code associated with the observed speed and maximum speed. The electronic ticket may comprise one or more of driver information, vehicle identifier, or a location of the event as detected or received by the officer computing device. In embodiments, the electronic ticket may comprise a fine amount associated with the event. The electronic ticket may further comprise payment information that may enable the fine amount to be paid at a motorist computing device. The electronic ticket may further comprise information associated with the officer computing device. This information may include one or more of an officer identifier, a vehicle identifier for a patrol vehicle, an agency associated with the officer computing device and/or officer, and a hardware identifier of the officer computing device. At least some of the information included in the electronic ticket may be automatically populated for the electronic ticket in accordance with information previously received or detected by the officer computing device. For example, a vehicle identifier included in a contact request may be further automatically included in an electronic ticket by a client application installed on the officer computing device. In embodiments, the electronic ticket may further comprise an electronic ticket number that uniquely identifies the electronic ticket.

In embodiments, transmitting (e.g., transmit electronic ticket 450) may be performed. The electronic ticket may be transmitted to a passenger computing device. The electronic ticket may be transmitted from an officer computing device over a network. The electronic ticket may be transmitted responsive to the electronic ticket being generated. For example, the electronic ticket may be automatically transmitted upon receipt of a predetermined set of information or, alternately, upon receipt of a manual input via a user interface at the officer computing device. The manual input, the predetermined set of information, or other instruction to transmit the electronic ticket may be received via a client application installed on the officer computing device.

In embodiments, confirming the electronic ticket (e.g., confirm ticket 452) may be performed. The electronic ticket may be confirmed at a passenger computing device to which the electronic ticket was transmitted. Confirming the electronic ticket may comprise a response indicating a user of the passenger computing device has received the electronic ticket. Confirming the electronic ticket may comprise transmitting a response to the electronic ticket to the officer computing device. Confirming the electronic ticket may comprise receiving user identity authentication at the passenger computing device. For example, an identity of the user of the passenger computing device may be authenticated via a face print sensor or fingerprint sensor integrated with the passenger computing device. Confirming the electronic ticket may comprise transmitting the response in accordance with one or more of a manual input or user identity authentication via a client application installed on the passenger computing device. The user identity may be confirmed locally at the passenger computing device without transmitting underlying identity authentication information from the passenger computing device. In accordance with the user identity authentication, confirming the electronic ticket may comprise determining a user that causes the confirmation of the electronic ticket is a same user that previously uploaded vehicle information (e.g., operation 414). Confirming the electronic ticket may comprise storing the electronic ticket on the passenger computing device for subsequent access and review. For example, the electronic ticket may be stored in a digital wallet maintained on the passenger computing device.

In embodiments, entering payment information (e.g., enter payment information 454) may be performed. The payment information may enable an electronic transfer of currency responsive to an electronic ticket. The payment information may be entered via a user interface of a passenger computing device. The payment information may be accessed from stored payment information. For example, entering the payment information may comprise accessing payment information previously stored on a passenger computing device. In some embodiments, the payment information may comprise information previously received by the passenger computing device during the event. For example, the payment information may comprise one or more of a fine amount or electronic ticket identifier received with an electronic ticket. At least some of the payment information may be automatically populated at the passenger computing device. For example, a client application installed on a passenger computing device at target vehicle 404 may automatically extract an electronic ticket identifier and fine amount from an electronic ticket and include this information in payment information.

In embodiments, transmitting payment information (e.g., transmit payment information 456) may be performed. The payment information may be transmitted responsive to the payment information being entered at a motorist computing device. The payment information may be transmitted from a motorist computing device at which an electronic ticket was previously received and confirmed. The payment information may be transmitted in accordance with a manual input to transmit the payment information being received at the motorist computing device. For example, a client application installed on a passenger computing device may provide an input by which the payment information may be transmitted. Responsive to the input received at the motorist computing device after the payment information is entered, the payment information may be transmitted from the motorist computing device to pay the electronic ticket. In embodiments, the motorist computing device may transmit the payment information to a remote computing device. For example, a passenger computing device at target vehicle 404 may transmit the payment information to one or more of remote computing device 406 or another remote computing device operable to receive the payment information and electronically transfer funds in accordance with the payment information. Accordingly, an electronic ticket may be conveniently paid via a passenger computing device in accordance with one or more of operations 454 or 456. The electronic ticket may be paid while the passenger computing device is located at a location of the event or, alternately, after the event and/or at a different location. In embodiments, an electronic ticket may be generated and/or transmitted, via separate computing device, different from remote computing device 406. The separate computing device may further handle payment information in accordance with various aspects of the present disclosure.

In embodiments, one or more operations performed by an officer computing device may be performed while the officer computing device is positioned in a patrol vehicle. For example, an officer computing device at patrol vehicle 402 may submit a contact request and issue an e-ticket while the officer computing device remains in patrol vehicle 402. The officer computing device, as well as a user of the officer computing device, may remain in vehicle during and between each of the operations associated with the officer computing device of method 400 according to various aspects of the present disclosure.

In embodiments, one or more operations performed by a passenger computing device may be performed while the passenger computing device is positioned in a target vehicle. For example, a passenger computing device at target vehicle 404 may receive a notification and participate in a location-based communication session while the passenger computing device remains in target vehicle 404. The passenger computing device, as well as a user of the passenger computing device, may remain in the stopped vehicle during, as well as between, each of the operations associated with the passenger computing device of method 400 according to various aspects of the present disclosure.

In embodiments, a system, method, or device for providing location-based communication may be provided. The system may comprise one or more elements of FIG. 1 or FIGS. 4A-4B, including as further implemented in accordance with one or more computing devices of FIGS. 2-3. For example, a system may comprise a remote computing device, an officer computing device, and at least one motorist computing device configured to perform one or more operations disclosed herein. Alternately or additionally, a method may comprise one or more operations of FIG. 4A-4B. The method may comprise a subset of disclosed operations performed by a device of FIG. 4A-4B. For example, a method may comprise one or more operations performed by a computing device, such as remote computing device 406. A device may further comprise one or more devices of FIG. 1 or FIGS. 4A-4B, including as further implemented in accordance with one or more computing devices of FIGS. 2-3. For example, a computing device, comprising a network interface, a non-transitory computer-readable storage medium, and a processor communicatively coupled to the network interface and the storage medium, wherein the processor is configured to execute instructions stored on the storage medium to cause the computing device to perform operations of one of the devices of FIGS. 1 and/or 4, such as remote computing device 406. The device may further include or exclude or more components discussed with regards to FIGS. 2-3 in various aspects of the present disclosure.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   storing, by a remote computing device, vehicle information comprising a vehicle identifier and contact information associated with one or more motorist computing devices;
   receiving, by the remote computing device, a contact request from an officer computing device at a location of an event, wherein the contact request includes the vehicle identifier and location information that identifies the location of the event; and
   responsive to the contact request received by the remote computing device and in accordance with the contact information, establishing, by the remote computing device, communication between the officer computing device and a passenger computing device of the one or more motorist computing devices, wherein the passenger computing device is located at the location of the event and the remote computing device is located remote from the location of the event.

2. The method of claim 1, wherein storing the vehicle information comprises:
   prior to receiving the contact request, receiving, by the remote computing device, driver information associated with the contact information; and
   prior to receiving the contact request, validating, by the remote computing device, the driver information, wherein the validating comprises verifying the driver information relative to information in a reference data store.

3. The method of claim 2, wherein the validating comprises transmitting a validation of the driver information from the remote computing device to the passenger computing device.

4. The method of claim 3, wherein the validation comprises validated driver information.

5. The method of claim 3, wherein the validation comprises a validation key generated in accordance with the driver information.

6. The method of claim 3, wherein establishing the communication between the officer computing device and the passenger computing device comprises transmitting the validation from the passenger computing device to the officer computing device.

7. The method of claim 1, wherein the contact information comprises one or more of a user identifier associated with the passenger computing device or a hardware identifier of the passenger computing device.

8. The method of claim 1, wherein:
   the one or more motorist computing devices comprise at least two motorist computing devices; and
   establishing the communication comprises:
      identifying, by the remote computing device, the at least two motorist computing devices from the vehicle information in accordance with the vehicle identifier; and
      transmitting a notification to each of the at least two motorist computing devices in accordance with the contact information.

9. The method of claim 8, wherein:
   the notification comprises the location information that identifies the location of the event; and the at least two motorist computing devices comprise the passenger computing device and a notified computing device disposed at a second location remote from the location of the event.

10. The method of claim 9, further comprising:
responsive to receiving the notification, comparing, by each motorist computing device of the at least two motorist computing devices, the location of the event identified by the location information of the notification and a current location of the motorist computing device.

11. The method of claim 10, further comprising:
in accordance with the comparing by the passenger computing device, determining, by the passenger computing device, the passenger computing device is located at the location of the event; and
responsive to the determining, providing the notification via a user interface of the passenger computing device, wherein the comparing by the passenger computing device indicates the current location of the passenger computing device matches the location of the event.

12. The method of claim 10, further comprising:
in accordance with the comparing by the notified computing device, determining, by the notified computing device, the notified computing device is not located at the location of the event; and
responsive to the determining, discarding, by the notified computing device, the notification, wherein the comparing by the notified computing device indicates the current location of the notified computing device does not match the location of the event.

13. The method of claim 9, further comprising:
in accordance with receiving the notification by the notified computing device, providing the notification via a user interface of the notified computing device in accordance with a configuration of the notified computing device.

14. A system comprising:
a remote computing device configured to perform first operations, comprising:
storing vehicle information comprising a vehicle identifier and contact information associated with one or more motorist computing devices;
receiving, by the remote computing device, a contact request from an officer computing device at a location of an event, wherein the contact request includes the vehicle identifier and location information that identifies the location of the event; and
responsive to the remote computing device receiving the contact request and in accordance with the contact information, establishing, by the remote computing device, communication between the officer computing device and a passenger computing device of the one or more motorist computing devices, wherein the passenger computing device is located at the location of the event and the remote computing device is located remote from the location of the event;
the officer computing device configured to perform second operations comprising:
determining the vehicle identifier;
determining the location of the event;
transmitting, to the remote computing device, the contact request including the vehicle identifier and the location information; and conducting the communication between the officer computing device and the passenger computing device; and
the passenger computing device configured to perform third operations comprising conducting the communication between the officer computing device and the passenger computing device.

15. The system of claim 14, wherein the communication is established in accordance with a comparison between a current location of the passenger computing device and the location information.

16. The system of claim 15, wherein:
establishing the communication comprises transmitting a notification comprising the location information to the passenger computing device; and
the third operations comprise:
determining the current location of the passenger computing device; and
performing the comparison between the current location of the passenger computing device and the location information, wherein the communication is conducted by the passenger computing device responsive to the comparison indicating the passenger computing device is located at the location of the event.

17. The system of claim 16, further comprising a notified computing device of the one or more motorist computing devices, wherein:
establishing the communication comprises transmitting the notification to the notified computing device; and
the notified computing device is configured to perform fourth operations comprising:
determining a current location of the notified computing device; and
performing a second comparison between the current location of the notified computing device and the location information, wherein the communication is not established between the notified computing device and the officer computing device responsive to the second comparison indicating the notified computing device is not located at the location of the event.

18. The system of claim 14, wherein the storing comprises:
receiving driver information associated with the passenger computing device;
validating the driver information relative to reference driver information;
generating a validation of the driver information; and
transmitting the validation to the passenger computing device, wherein the third operations comprise storing the validation in a non-transitory computer readable storage medium of the passenger computing device.

19. The system of claim 18, wherein conducting the communication by the passenger computing device comprises transmitting the validation from the passenger computing device to the officer computing device.

20. A computing device, comprising:
a network interface;
a non-transitory computer-readable storage medium; and
a processor communicatively coupled to the network interface and the storage medium, the processor configured to execute instructions stored on the storage medium to cause the computing device to perform operations comprising:

storing, by the storage medium, vehicle information comprising a vehicle identifier and contact information associated with one or more motorist computing devices;

receiving, via the network interface, a contact request from an officer computing device at a location of an event, wherein the contact request includes the vehicle identifier and location information that identifies the location; and after the contact request is received by the computing device and in accordance with the contact information and the location information of the contact request, establishing, by the computing device, audiovisual communication via the network interface between the officer computing device and a passenger computing device of the one or more motorist computing devices, wherein the passenger computing device is located at the location of the event and the computing device is located remote from the location of the event.

* * * * *